US012429199B2

(12) United States Patent
Kennedy

(10) Patent No.: US 12,429,199 B2
(45) Date of Patent: Sep. 30, 2025

(54) RIDGELINE ROOF CLIP

(71) Applicant: Canny Systems, LLC, Mansfield, TX (US)

(72) Inventor: Stacy L. Kennedy, Mansfield, TX (US)

(73) Assignee: CANNY SYSTEMS, LLC, Mansfield, TX (US)

( * ) Notice: Subject to any disclaimer, the term of this patent is extended or adjusted under 35 U.S.C. 154(b) by 0 days.

(21) Appl. No.: 19/040,669

(22) Filed: Jan. 29, 2025

(65) Prior Publication Data

US 2025/0172278 A1 May 29, 2025

Related U.S. Application Data

(63) Continuation of application No. 18/977,754, filed on Dec. 11, 2024, now Pat. No. 12,305,833, which is a continuation of application No. 17/535,332, filed on Nov. 24, 2021, now Pat. No. 12,196,396.

(51) Int. Cl.
  *F21V 21/088* (2006.01)
  *E04D 13/00* (2006.01)
  *G09B 19/00* (2006.01)

(52) U.S. Cl.
  CPC .......... *F21V 21/088* (2013.01); *E04D 13/00* (2013.01); *G09B 19/003* (2013.01)

(58) Field of Classification Search
  CPC ...... F21V 21/088; E04D 13/00; G09B 19/003
  See application file for complete search history.

(56) References Cited

U.S. PATENT DOCUMENTS

| | | | | |
|---|---|---|---|---|
| 4,905,131 A | * | 2/1990 | Gary | F21S 4/10 362/249.11 |
| 5,249,108 A | * | 9/1993 | Gary | F21S 4/10 248/314 |
| 5,581,956 A | * | 12/1996 | Fennessy | F21V 21/088 362/396 |
| 6,824,404 B1 | * | 11/2004 | Sugar | H01R 33/965 439/135 |
| 7,367,697 B2 | * | 5/2008 | George | F21S 4/10 362/396 |
| 7,963,490 B2 | * | 6/2011 | Pritchard | F21V 21/088 248/211 |
| 8,308,323 B2 | * | 11/2012 | Holland | F21S 4/10 362/396 |
| 9,644,821 B2 | * | 5/2017 | Zhang | F21V 21/08 |
| 10,180,242 B2 | * | 1/2019 | Schreiber | F21S 4/10 |
| 10,557,620 B2 | * | 2/2020 | Felt | F21V 21/088 |

(Continued)

*Primary Examiner* — Anita M King
(74) *Attorney, Agent, or Firm* — ICE MILLER LLP; Justin D. Swindells

(57) ABSTRACT

A clip device for holding a bulb in fixed relationship relative to a ridgeline of a roof. The clip device includes a front side and a back side opposite the front side, a top side and a bottom side opposite the top side, and a first side and a second side opposite the first side. Two shoulders transition into corresponding legs having at least one hook on each leg. A top portion of the clip device includes a finger portions terminating with respective clip portions at their tips. Tabs are arranged along the fingers. The legs are configured such that spreading the legs away from one another causes the finger portions to bend toward one another, and squeezing the legs together causes the finger portions to bend away from one another.

24 Claims, 22 Drawing Sheets

(56) References Cited

U.S. PATENT DOCUMENTS

| | | | | |
|---|---|---|---|---|
| 11,674,672 B1* | 6/2023 | Roper | ........................ | F16B 2/20 |
| | | | | 362/396 |
| 11,879,619 B2* | 1/2024 | Kennedy | ............... | F21V 21/088 |

* cited by examiner

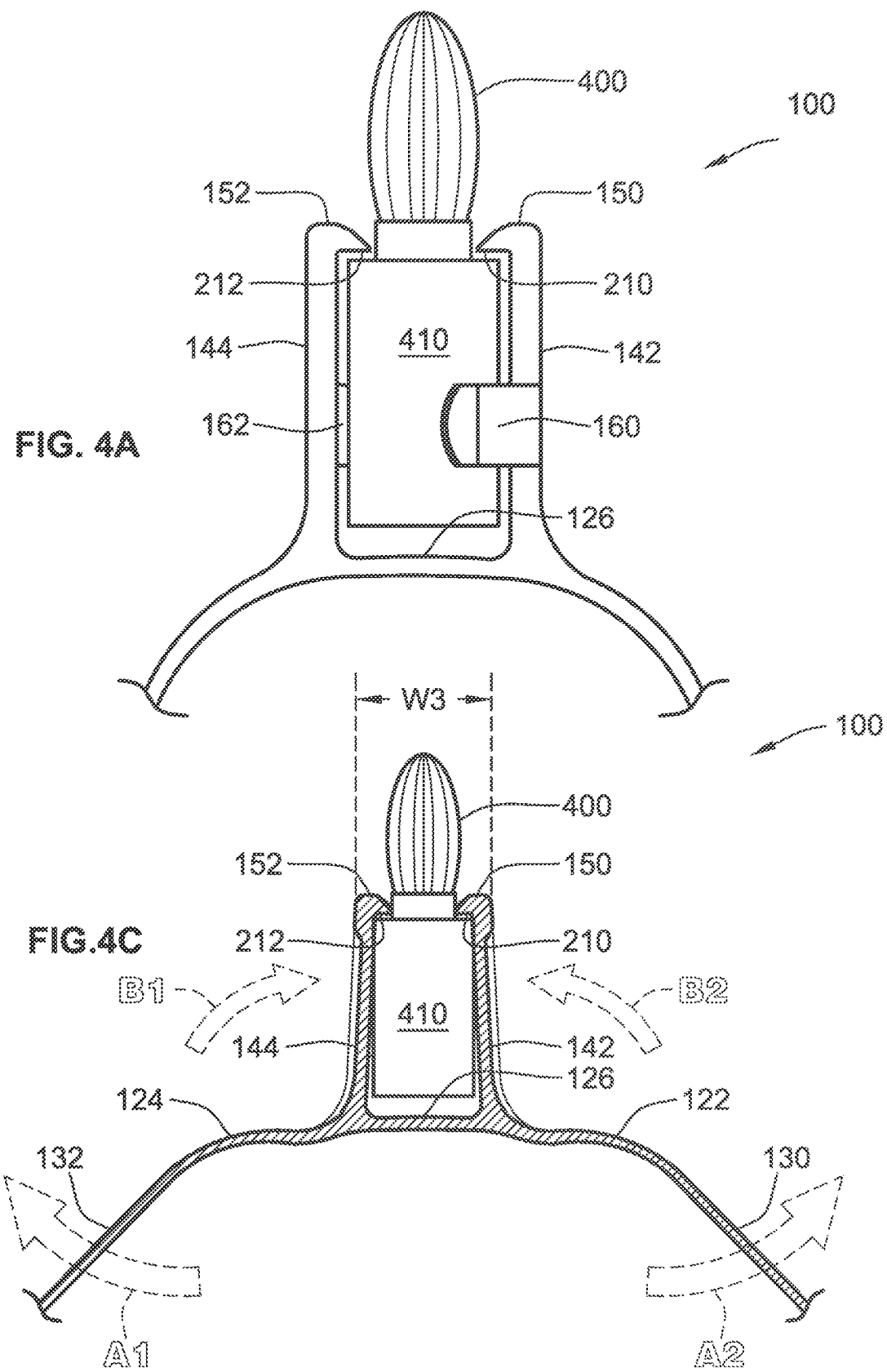

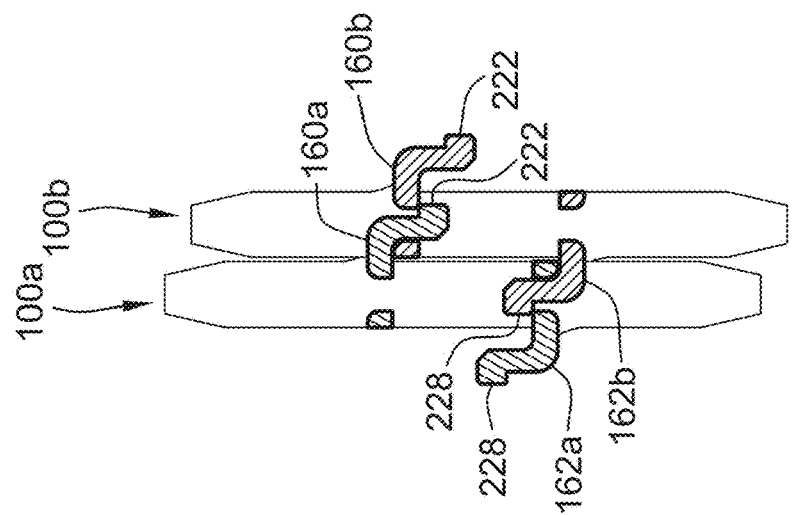
FIG. 7C
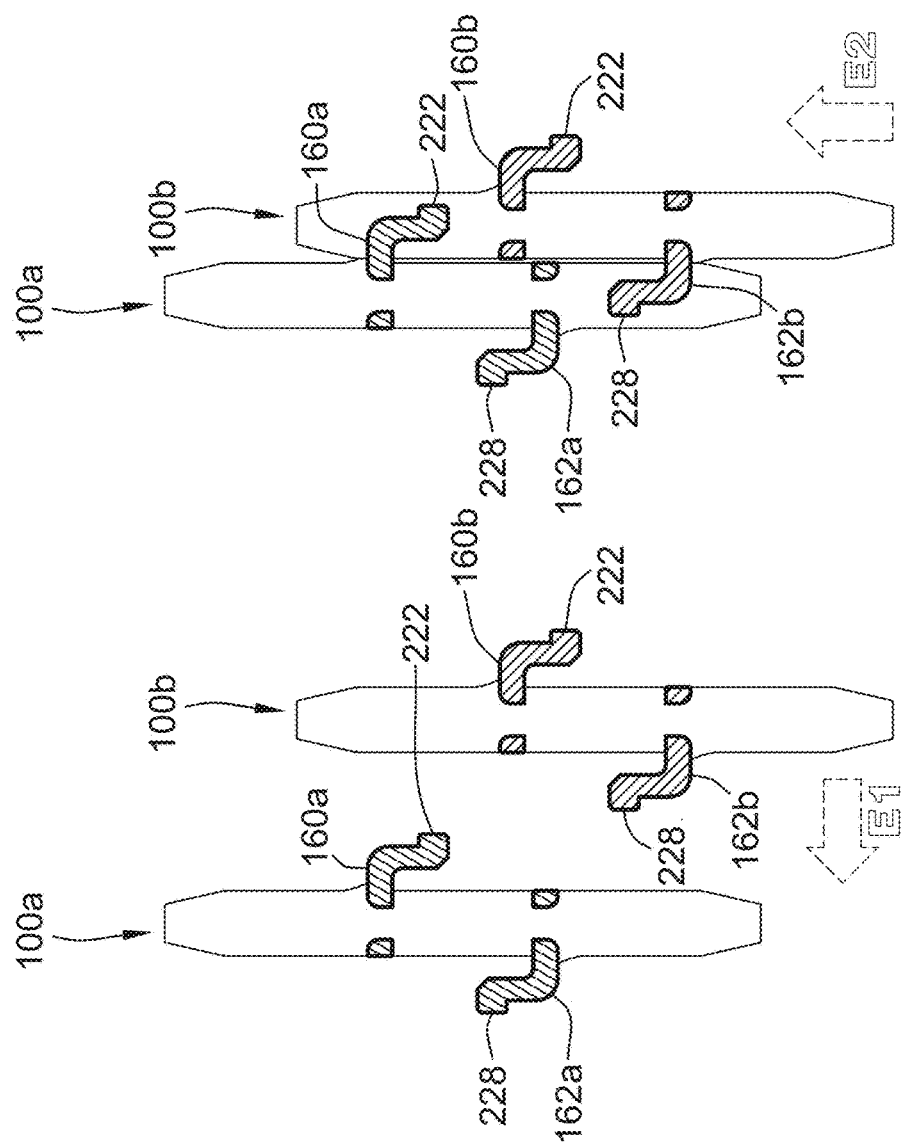
FIG. 7B
FIG. 7A

RIDGELINE ROOF CLIP

CROSS-REFERENCE TO RELATED APPLICATIONS

This application is a continuation of prior U.S. patent application Ser. No. 18/977,754, filed Dec. 11, 2024, which is a continuation of U.S. patent application Ser. No. 17/535,332, filed on Nov. 24, 2021, which are hereby incorporated by reference herein in their entireties.

FIELD OF THE INVENTION

The present disclosure relates generally to a ridgeline roof clip, and, more specifically, to a clip for holding lights of decorative light strings securely to a ridgeline of a roof.

BACKGROUND OF THE INVENTION

Homeowners and businesses enjoy arranging decorative lights during special seasons (such as Christmas) to create illuminated patterns of light visible primarily at nighttime. One popular place to install decorative lights is on the ridgeline or ridge of a roof structure covering a dwelling or other housing structure. A ridgeline, in the context of a roof, is the apex or topmost peak of the roof, which is typically covered by tiles or shingles. One particularly appealing visual effect is to arrange lights, such as light bulbs connected together to form a light string, in a straight line on the ridgeline of the roof. Conventional installation and disassembly of light strings into and out of ridge clips used on roof ridgelines are needlessly time-consuming and can cause damage to the string light wires and/or to the clips themselves.

What is needed is an improved ridge clip for a roof ridgeline that facilitates rapid and tangle-free installation of bulbs of a variety of diameters and sizes, hold the bulbs in a straight and secure manner centered on the apex of the ridgeline of the roof, include wire management features to keep wires tidy, straight, and un-entangled, accommodates shingles and tiles of different dimensions, retains the bulbs securely against wind and other deleterious weather events when installed but allows the bulbs to be removed rapidly and easily without causing any damage to the clip or the roof shingles or tiles, among other needs.

The present disclosure is directed to address these and other needs.

SUMMARY OF THE INVENTION

According to one aspect of the present disclosure, a clip device is disclosed. The clip device includes: a front side and a back side opposite the front side, a top side and a bottom side opposite the top side, and a first side and a second side opposite the first side; a body having a first shoulder, a second shoulder opposite the first shoulder, and an upper surface between the first shoulder and the second shoulder; a first leg coupled to the first shoulder and a second leg coupled to the second shoulder; a top portion formed along the upper surface, the top portion including a first finger portion proximate the first shoulder and a second finger portion proximate the second shoulder, the first finger portion including a first clip portion at a tip of the first finger portion; the second finger portion including a second clip portion at a tip of the second finger portion; a first tab and a second tab, the first tab being along the front side and projecting toward the first side of the clip device, the second tab being along the back side and projecting toward the second side of the clip device; a first hook along or at an end of the first leg angled toward the upper surface and the second side; a second hook along or at an end of the second leg angled toward the upper surface and the first side, the first leg and the second leg being configured such that spreading the first and second legs away from one another causes the first and second finger portions to bend toward one another, and squeezing the first and second legs together causes the first and second finger portions to bend away from one another.

The first tab can be on the first finger and the second tab can be on the second finger. The first and second tabs can be configured to interlock with corresponding tabs of another clip device. A width of the first leg can taper from the first shoulder toward the first hook such that the width at the first shoulder is at least 30% greater than the width at the first hook. A width of the second leg can taper from the second shoulder toward the second hook such that the width at the second shoulder is at least 30% greater than the width at the second hook.

The first tab can include a first member extending toward the second tab and terminating at a second member extending away from the front side. The first finger portion can include a first elongated slot dimensioned to receive therein a corresponding tab configured as the first tab of a second clip device. The first member can have a surface facing toward the back side, and the second member can have a depth dimension dimensioned to pass through the first elongated slot of the second clip device.

The first finger portion can include a first elongated slot dimensioned to receive therein a corresponding tab configured as the first tab of another clip device. The second finger portion can include a second elongated slot dimensioned to receive therein a corresponding tab configured as the second tab of another clip device.

Two or more clip devices can be clipped together by their corresponding first and second tabs to form a stacking arrangement in which the clip devices are stacked at an offset corresponding to at least a thickness of the first tab.

The first clip portion can have a sloped upper surface facing away from the top side and a bottom engagement surface facing toward and generally parallel with the upper surface. The clip device can be generally mirror-image symmetrical about a central axis extending along a height dimension of the clip device such that a gap between the first finger portion and the second finger portion is generally centered relative to the upper surface.

A method of instructing installation of a plurality of clip devices on a roof having a plurality of shingles or tiles arranged on a ridgeline of the roof is also disclosed. The method includes the steps of (a) instructing an installer to insert a bulb socket of a light string including a plurality of bulbs between the first finger portion and the second finger portion of a first of the plurality of clip devices until the bulb socket is secured by the first clip portion and the second clip portion between the first finger portion and the second finger portion; (b) instructing the installer to spread the first leg and the second leg away from each other to cause the first and second clip portions to bend toward one another to clamp the bulb socket between the first and second finger portions, and then installing the first clip device to straddle a first shingle or tile of the plurality of singles or tiles on the ridgeline by causing the first and second hooks to hook under respective ends of the first shingle or tile to hold the first clip device in an upright manner on the ridgeline with a first bulb coupled to the bulb socket pointing away from the roof; and repeating the steps (a) and (b) for each of the remaining ones of the bulb sockets of the light string until a desired number of clip devices are installed on the ridgeline of the roof.

The method can optionally further include the step of (a1) instructing the installer to arrange wires of the light string so that they run underneath, relative to the top side, the first tab and the second tab, wherein the repeating includes repeating the step of (a1) for each of the remaining ones of the bulb sockets.

A method of instructing uninstallation of a plurality of clip devices on a roof having a plurality of shingles or tiles arranged on a ridgeline of the roof is disclosed. The method includes the steps of: (a) instructing an installer to unhook the first and second legs of a first clip device of the plurality of clip devices from the roof to free the first clip device from the roof; (b) instructing the installer to squeeze the first leg and the second leg together to cause the first and second finger portions to bend away from one another until a bulb socket is released from the first clip portion and the second clip portion; and repeating the steps (a) and (b) for each of the remaining ones of the bulb sockets of the light string until the plurality of clip devices are uninstalled from the roof.

The first finger portion of each of the plurality of clip devices can include a first elongated slot formed along the first finger portion, and the second finger portion of each of the plurality of clip devices can include a second elongated slot formed along the second finger portion. The method can further include the step of instructing the installer to stack at least some of the plurality of clip devices together for storage, responsive to removing the bulb sockets from the at least some of the plurality of clip devices, by interlocking corresponding pairs of the first and second tabs of a given one of the plurality of clip devices into corresponding first and second elongated slots of an other one of the plurality of clip devices that is adjacent to the given one of the plurality of clip devices.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 4A is side view of the top portion of the clip device of FIG. 1 with a bulb socket and bulb inserted into the top portion and held in place by clip devices and tabs arranged on the top portion.

FIG. 4C is a side view of the top portion of the clip device shown in FIG. 4B after the legs have been stretched apart and showing the corresponding inward rotation of the fingers of the top portion grabbing onto the bulb socket to hold it securely in the clip device.

FIG. 7A is a top view of two clip devices about to be interlocked by moving one in the direction of arrow E1.

FIG. 7B is a top view of the two clip devices shown in FIG. 7A in which one device is slid past while in contact with the other along the direction of arrow E1.

FIG. 7C is a top view of the two clip devices shown in FIG. 7A interlocked together such that one tab of each device is inserted through a corresponding slot of the other to form an interlocked pair.

Figure 1:
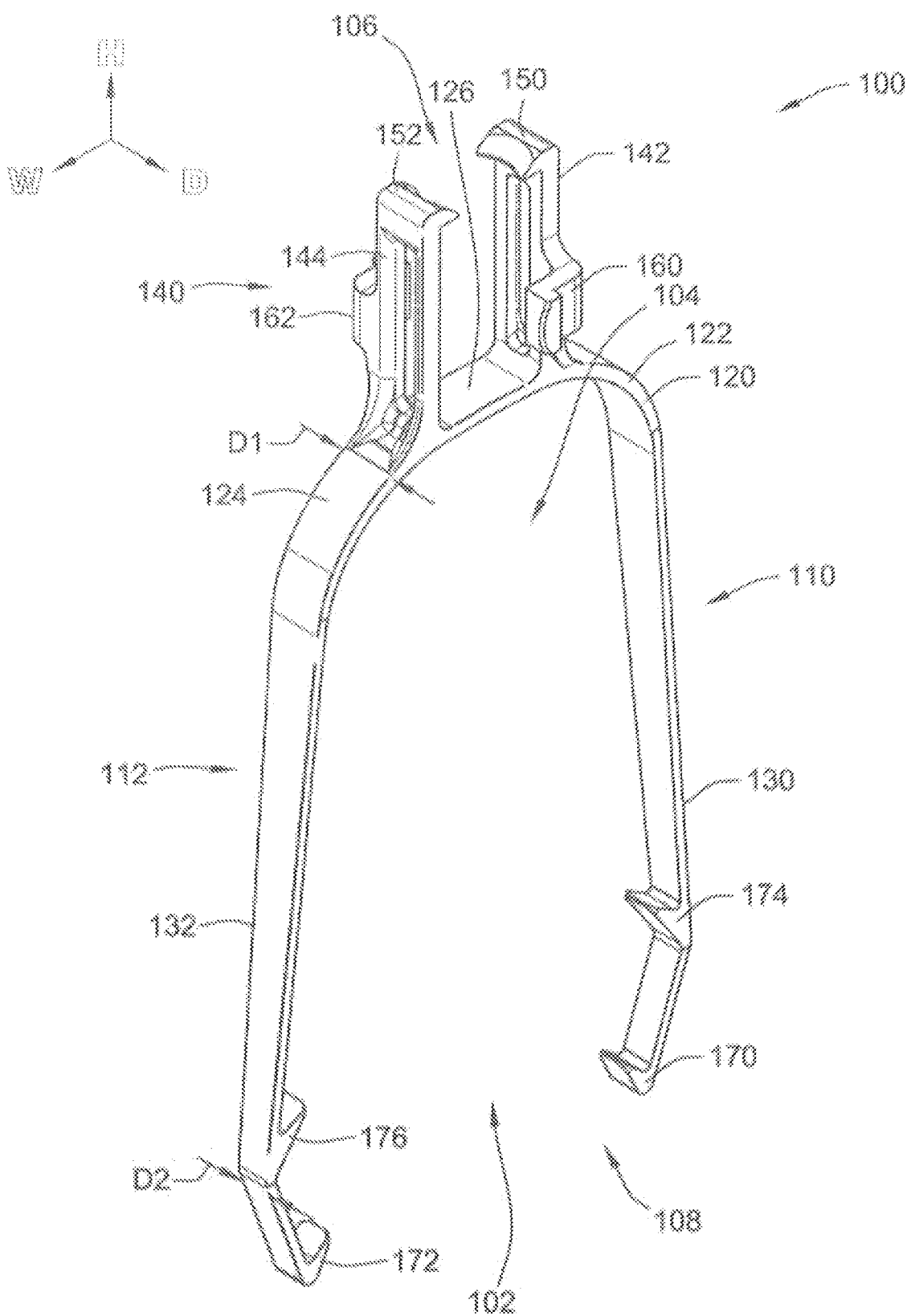
FIG. 1 is a top isometric view of a clip device according to an aspect of the present disclosure.

While aspects of the present disclosure are susceptible to various modifications and alternative forms, specific embodiments and configurations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the invention as defined by the appended claims.

DETAILED DESCRIPTION

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Referring to FIG. 1, an isometric view of a clip device 100 is shown according to an aspect of the present disclosure. In general, for ease of discussion, reference numbers first introduced in a figure will begin with the number of that figure. Some features as indicated have been omitted for ease of illustration. The dimensions, height, width, and depth are used herein, and an example legend is shown in FIG. 1 et seq., where D, H, W can approximately correspond to conventional X, Y, Z axes. The clip device 100 as shown in FIG. 1 is oriented in an upright configuration relative to earth. Thus, the clip device 100 has a front side 102 and a back side 104 opposite the front side, a top side 106 and a bottom side 108 opposite the top side, and a first side 110 and a second side 112 opposite the first side. The terms "top" and "bottom" are relative to earth.

Figure 2:
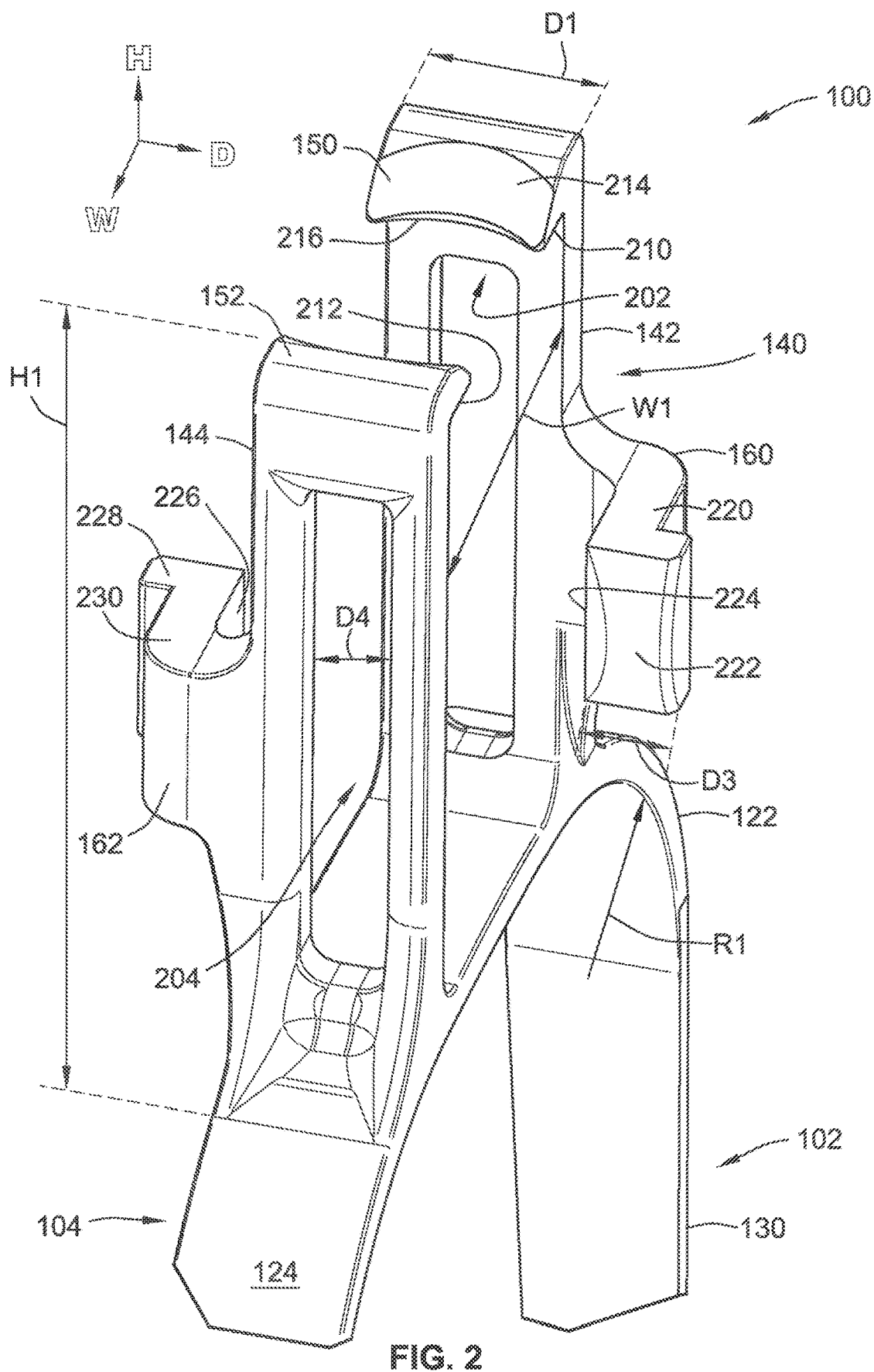
FIG. 2 is an enlarged view of a top portion of the clip device shown in FIG. 1.

The clip device includes a body 120 having a first shoulder 122, a second shoulder 124 opposite the first shoulder 122, and an upper surface 126 between the first shoulder 122 and the second shoulder 124. An exemplary radius of a bend of the shoulder 122, 124, RI, shown in FIG. 2, can be 1.0 inch. The clip device includes a first leg 130 coupled to the first shoulder 122 and a second leg 132 coupled to the second shoulder 124. The clip device 100 includes a top portion 140 formed along the upper surface 126. The top portion 140 includes a first finger portion 142 proximate the first shoulder 122 and a second finger portion 144 proximate the second shoulder 124. The first finger portion 142 includes a first clip portion 150 at a tip of the first finger portion 142 toward the top side 106 of the clip device 100. The second finger portion 144 includes a second clip portion 152 at a tip of the second finger portion 144 toward the top side 106 of the clip device.

Figure 4B:
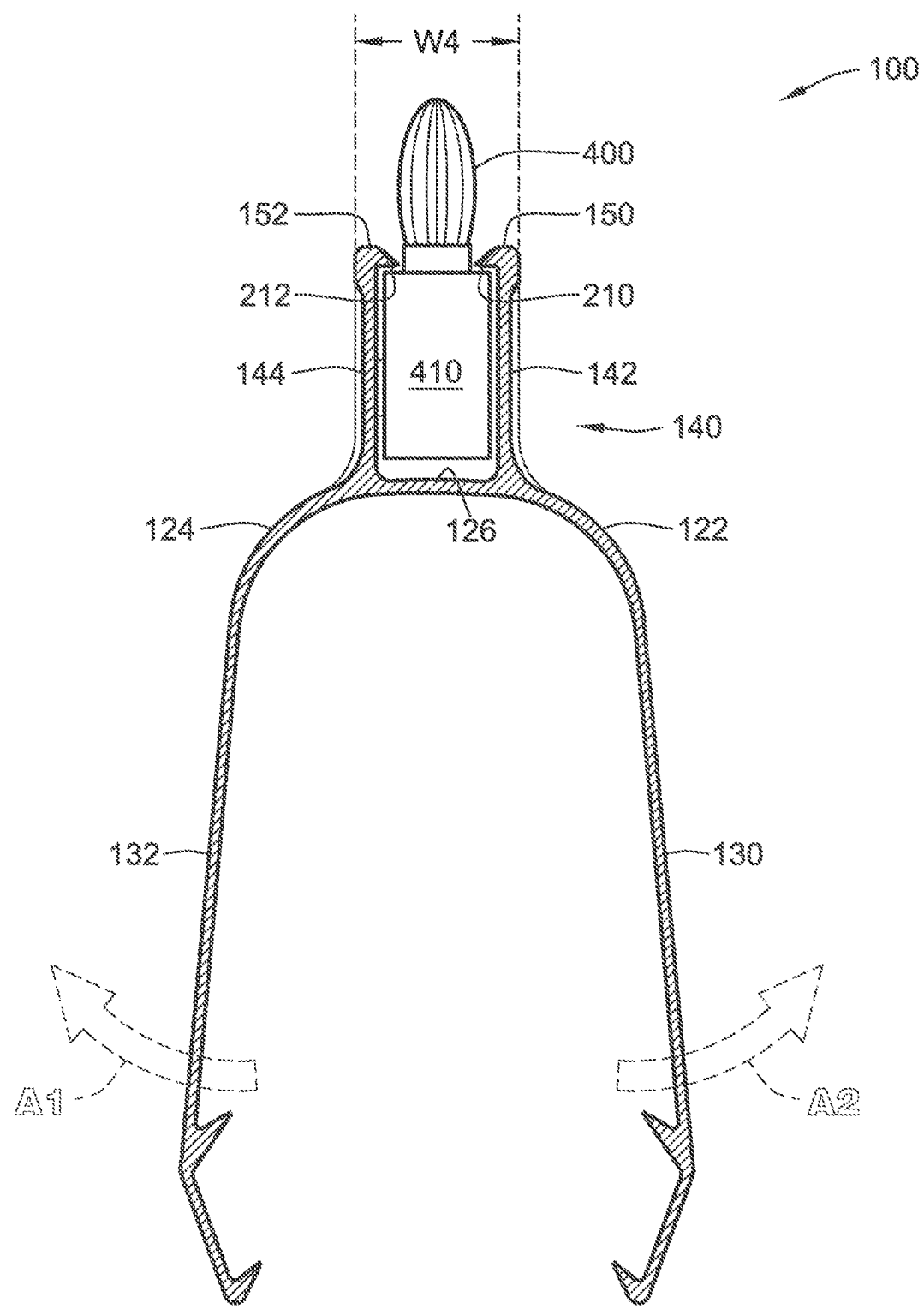
FIG. 4B is a side view of the clip device of FIG. 4A with the bulb socket installed showing a direction of spreading the legs of the clip device apart to secure the bulb socket in the top portion of the clip device.
Figure 5A:
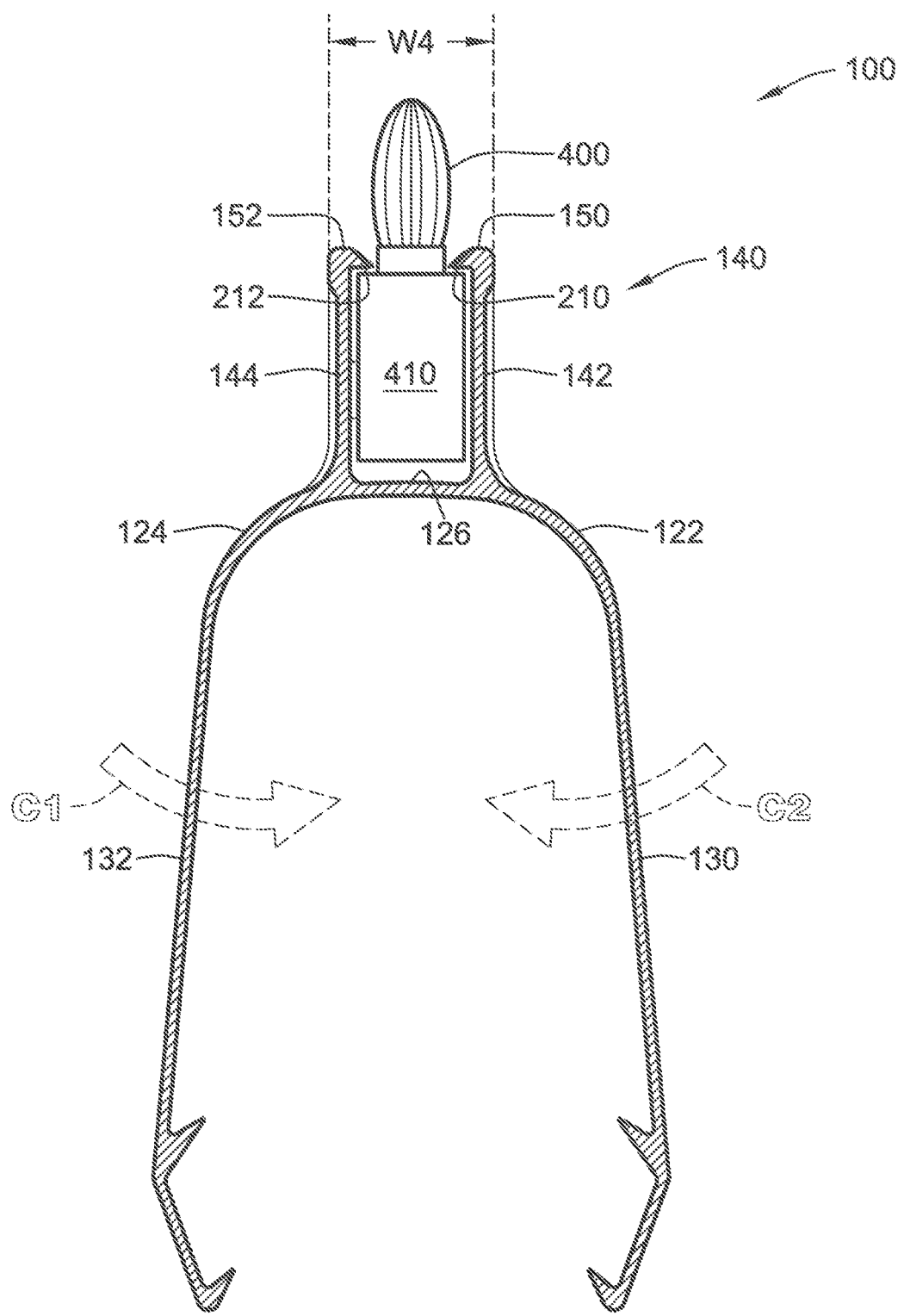
FIG. 5A is a side view of the clip device of FIG. 1 with a bulb socket installed showing a direction of squeezing the legs together to release the bulb socket from the clip device.
Figure 5B:
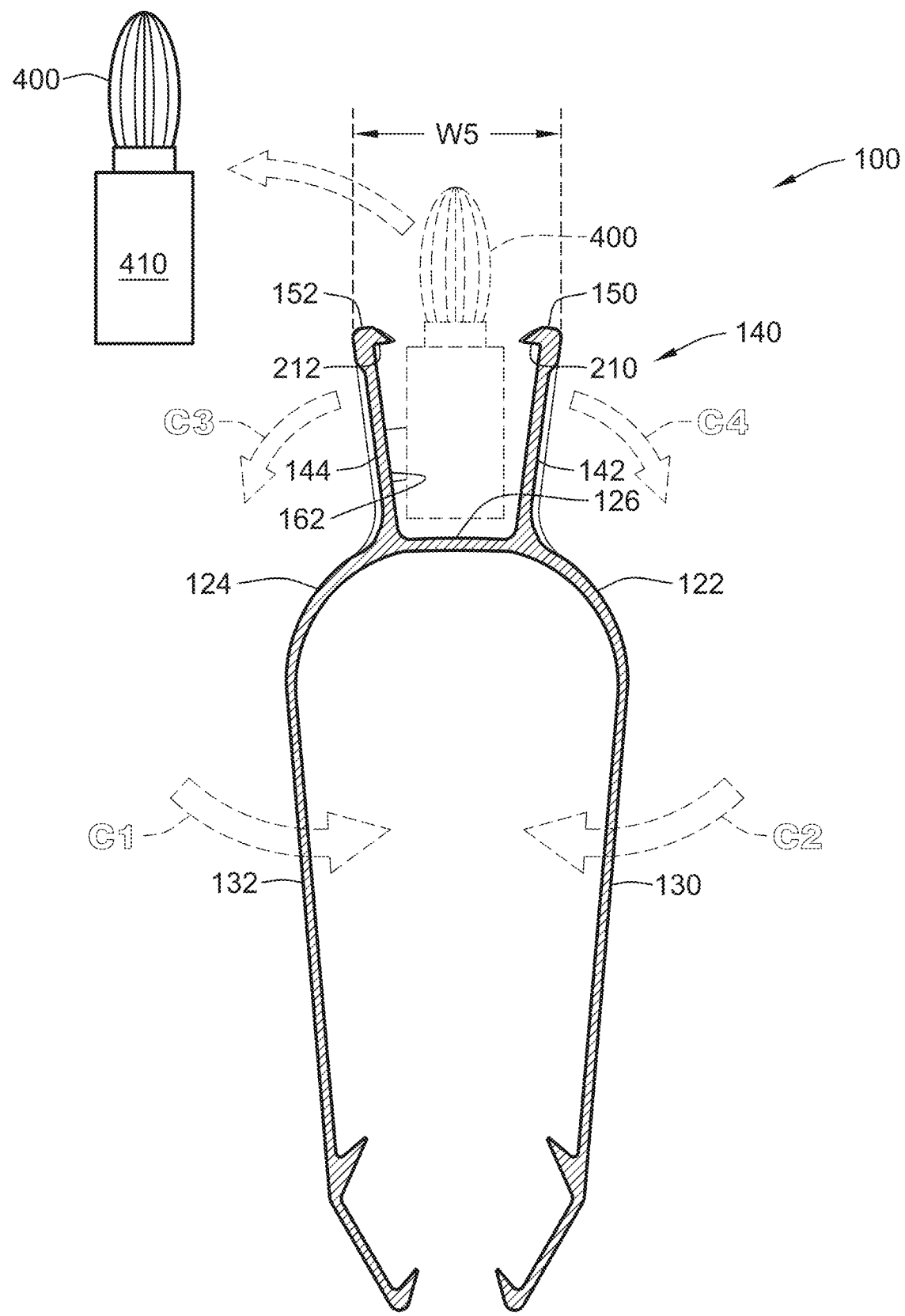
FIG. 5B is a side view of the clip device shown in FIG. 5A with the legs squeezed together to release the bulb socket from the top portion of the clip device.

The clip device includes a first retention tab 160 and a second retention tab 162. The first retention tab 160 is along the front side 102 and projects toward the first side 110 of the clip device 100. The second retention tab 162 is along the back side 108 and projects toward the second side 112 of the clip device 100. The clip device 100 includes a first hook 170 along or at an end of the first leg 130 angled toward the upper surface 126 and the second side 112. The clip device 100 includes a second hook 172 along or at an end of the second leg 132 angled toward the upper surface 126 and the first side 110. The first leg 130 and the second leg 132 are configured such that spreading the first and second legs 130, 132 away from one another causes the first and second finger portions 142, 144 to bend toward one another, and, conversely, squeezing the first and second legs 130, 132 together causes the first and second finger portions 142, 144 to bend away from one another. These actions can be seen in more detail in FIGS. 4B, 4C, 5A, and 5B. In FIG. 4B, the legs 130, 132 are spread apart from one another in the directions of arrows A1, A2, which, in turn, causes the clip portions 150, 152 to pinch inwardly toward one another (see arrows B1, B2 in FIG. 4C) to retain the top of the bulb socket 210 in the clip device 100, as shown in FIG. 4C.

The first retention tab 160 is on the first finger 142 and the second retention tab 162 is on the second finger 144. The first and second retention tabs 160, 162 are configured to interlock with corresponding tabs of another clip device 100. A width D1 of the first leg 130 tapers from the first shoulder 122 toward the first hook 170, 174 such that the width, D1, at the first shoulder 122 is at least 30% or at least 35% or at least 40% greater than the width, D2, at the first hook 170, 174. Correspondingly, a width, D1, of the second leg 132 tapers from the second shoulder 124 toward the second hook 172, 176 such that the width D1 at the second shoulder 124 is at least 30% or at least 35% or at least 40% greater than the width, D1, at the second hook 172, 176. For example, D1 can be 0.38 inches, and D2 can be 0.22 inches, and the legs 130, 132 taper so that they narrow from the shoulders 122, 124 toward the most distal hooks 170, 172 at the bottom side 108.

The first retention tab 160 includes a first member 220 extending toward the second retention tab 162 or toward the second finger 144 and terminating at a second member 222 (see FIG. 2) extending away from the front side 102. The second retention tab 162 includes a first member 230 extending toward the first retention tab 160 or toward the first finger 142 and terminating at a second member 228 (see FIG. 2) extending away from the back side 104 of the clip device 100. The second member 228 has a surface 226 facing toward the front side 102.

The first finger portion 142 includes a first elongated slot 202 (best seen in FIG. 2) dimensioned to receive therein a corresponding tab configured as the first tab 142 of a second clip device 100. The first member 220 has a surface 224 facing toward the back side 108, and the second member 222 has a depth, D3, dimensioned to pass through the first elongated slot 202 of an adjacent clip device 100 when stacked together.

The first finger portion 142 includes a first elongated slot 202 (FIG. 2) dimensioned to receive therein a corresponding tab configured as the first retention tab 160 of another clip device like the clip device 100 shown in FIG. 1, and the second finger portion 162 includes a second elongated slot 204 (FIG. 2) dimensioned to receive therein a corresponding tab configured as the second retention tab 162 of another clip device like the clip device 100 shown in FIG. 1. An example width or distance, D4 (FIG. 2), of the elongated slot 202, 204 is 0.19 inches, which is equal to the depth, D3 (FIG. 2), of the second member 222, 228 of the retention tabs 160, 162. The dimension, D3, can be slightly larger than D4.

Figure 6A:
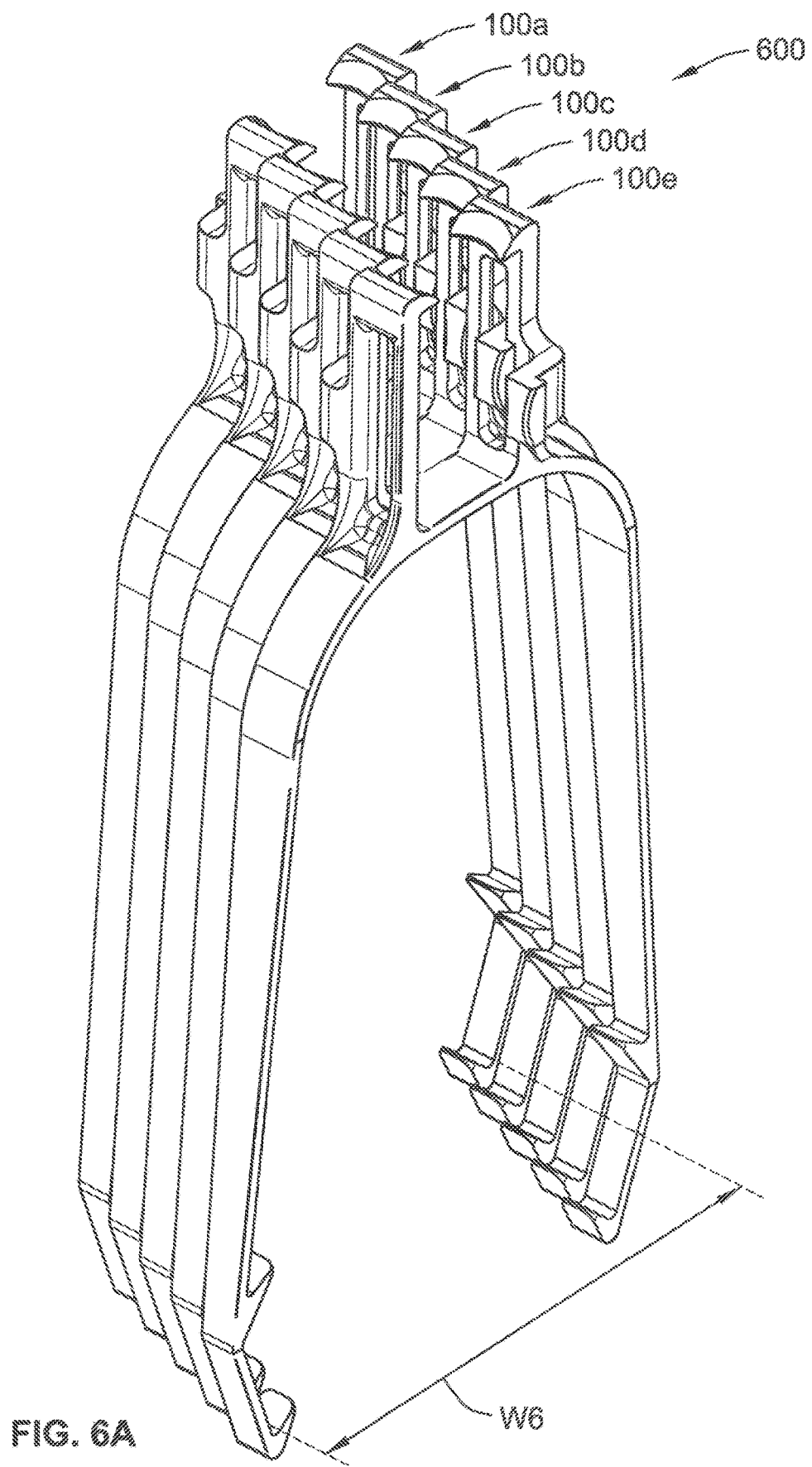
FIG. 6A is a top isometric view of five clip devices interlocked together by their corresponding tabs in a stacked arrangement for storage or packing.
Figure 6B:
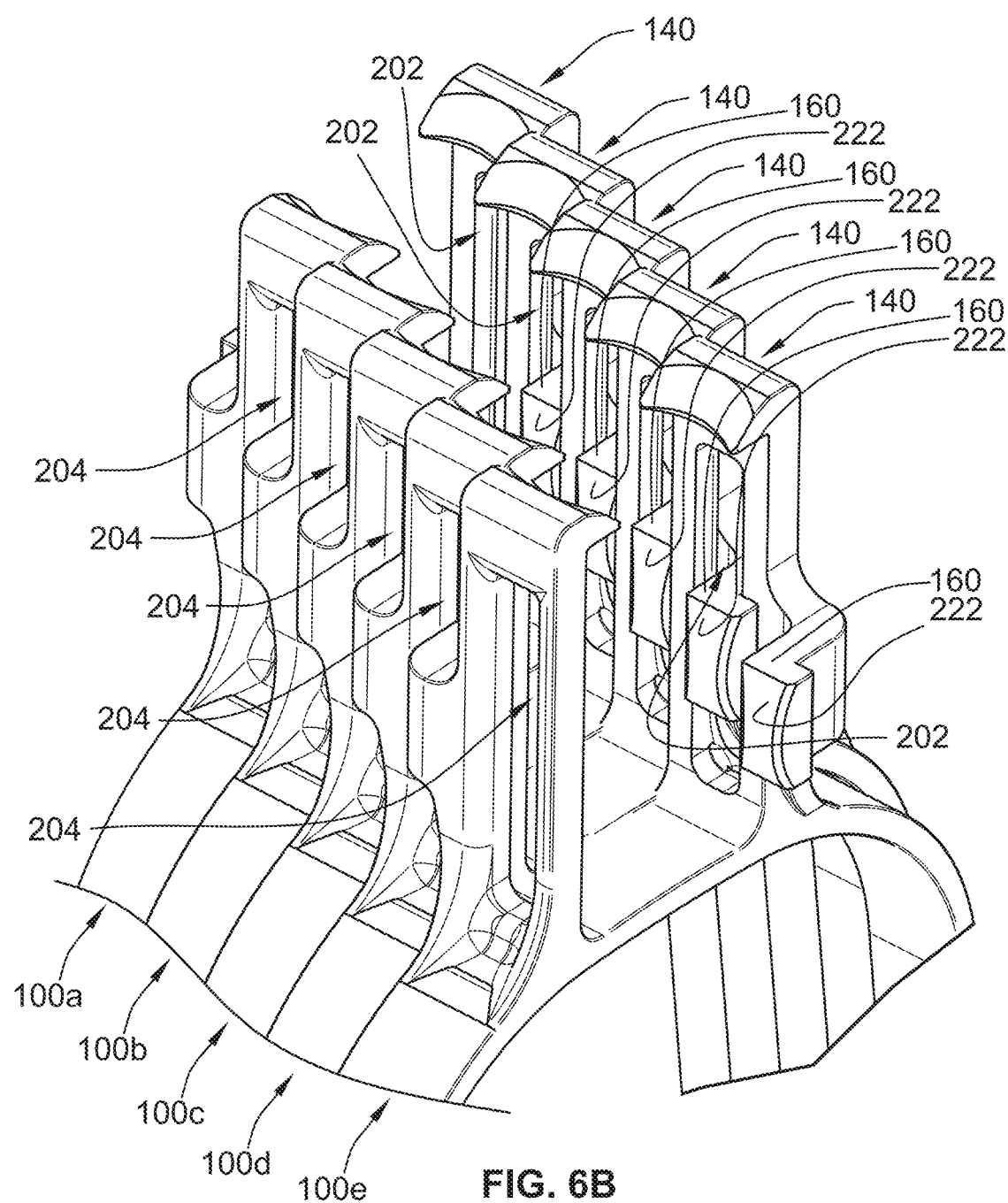
FIG. 6B is an enlarged view of the top portions of the clip devices shown in FIG. 6A with the tabs interlocked to clip the clip devices to one another.

Adjacent clip devices, each like the clip device 100 shown in FIG. 1, can be clipped together by their corresponding first and second retention tabs 160, 162 to form an interlocking stacking arrangement 600 in which the clip devices 100a-e (shown in FIG. 6A) are stacked at an offset corresponding to at least a thickness, D3, of the first retention tab 160 (see FIG. 6B). Each clip device, e.g., 100a, is slightly offset from the immediately adjacent clip device, e.g., 100b, by a distance, W7, seen in FIG. 3, such that the total width of the stacked assembly of clip devices 100a,b,c,d,e, seen in FIG. 6A, corresponds to a dimension W6 corresponding to W7 (FIG. 3) multiplied by the number of clip devices 100a-e. In one example, the offset distance, W7, is about 0.12 inches. Thus, when five clip devices 100 are stacked together as shown in FIG. 6A, W6 increases the overall width by 0.12 inches×5=0.6 inches. This allows multiple clip devices 100a-e when not being used to be stacked in a compact assembly in a neat and organized manner without having the legs and hooks intertwine, creating a tangled mess that would be difficult to singulate all the clip devices from one another. Conventional clips are typically stored in a bag, but the legs and hooks and other grabbing surfaces tend to become discombobulated and intertwined together. The present disclosure avoids this scenario. The retention tabs 160, 162 have another purpose, which is to retain a bulb socket 410 (see FIG. 4A) securely between the fingers 142, 144, so that the bulb socket 410 does not tilt or fall out of the clip device 100.

The first clip portion 150 has a sloped upper surface 214 (FIG. 2) ending at edge 216 facing away from the top side 106 and a bottom engagement surface 210 (FIG. 2) facing toward and generally parallel with the upper surface 126. The clip device 100 is generally mirror-image symmetrical about a central axis $A_H$ (FIG. 3) extending along a height dimension, H, of the clip device 100 such that a gap 302 (FIG. 3) between the first finger portion 142 and the second finger portion 144 is generally centered relative to the upper surface 126. This means that when a bulb socket 410 is installed into a clip device 100, the light bulb 400 coupled to the bulb socket 410 will be centered along the ridgeline 800 of the roof (FIG. 8), creating a uniform and aligned appearance when multiple bulbs 400a-f are attached by corresponding clip devices 100a-f on the ridgeline 800. When the bulbs 400 are turned on, they all have a consistent orientation toward the sky, are spaced apart at regular distances slack in the wires, creating an organized, neat appearance. Even in inclement weather, such as in the presence of high winds or a snowstorm, the bulbs and sockets 400, 410 will remain securely in the clip device 100 and will not tilt or fall over or out of the retention tabs 160, 162. The elongated slots 202, 204 also provide less drag or resistance to wind, allowing wind, no matter which direction it blows, opportunities to pass through or around the clip device 100 and bulb/socket 400, 410, further reducing the chance of the bulb socket 410 becoming dislodged from or tilting out of the grasp of the finger portions 142, 144, in cooperation with the bottom engagement surfaces 210, 212 of the clip portions 150, 152 and the retention tabs 160, 162. A minimum of only two finger portions 142, 144 are needed to retain a bulb socket 410 securely within the clip device 100 without risk of falling out or over even in the presence of inclement weather such as high winds or rain/snow.

The gap 302 (FIG. 3) is dimensioned to accommodate a C7 and C9 bulb diameter. For example, the width, W1, of the gap 302 can be 0.81 inches, which can accommodate both C7 and C9-type bulb sockets. Each of the finger portions 142, 144 has a height, H1, that is at least as tall as a C7/C9 bulb socket. For example, H1 can be 1.56 inches, but the height up to the bottom engagement surfaces 210, 212 (FIG. 3) can be 1.43 inches, which is slightly taller than a height of a standard C7/C9 bulb socket.

Figure 3:
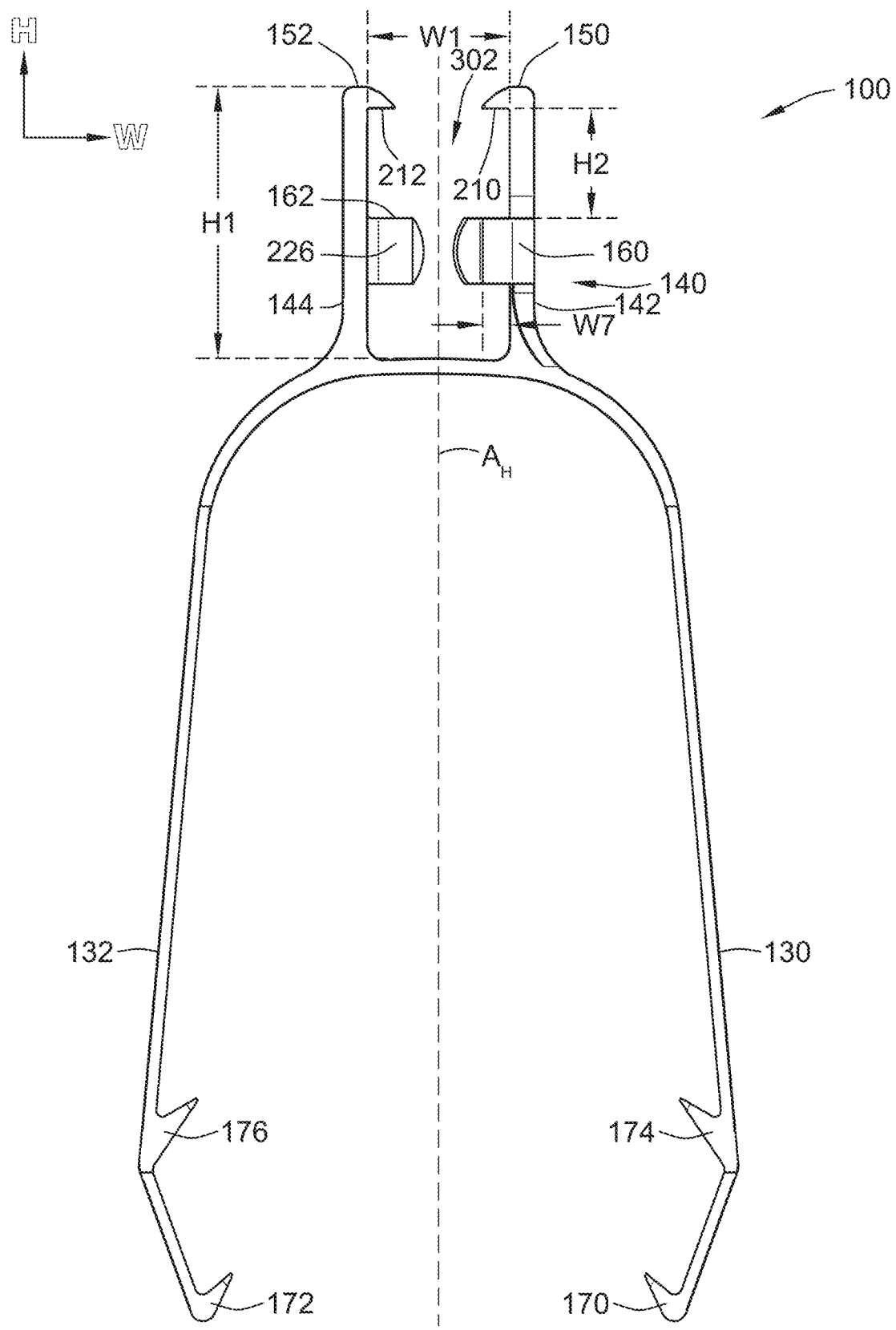
FIG. 3 is a side view (the other side being a mirror image) of the clip device shown in FIG. 1 without a bulb socket inserted into the top portion of the clip device.
Figure 9A:
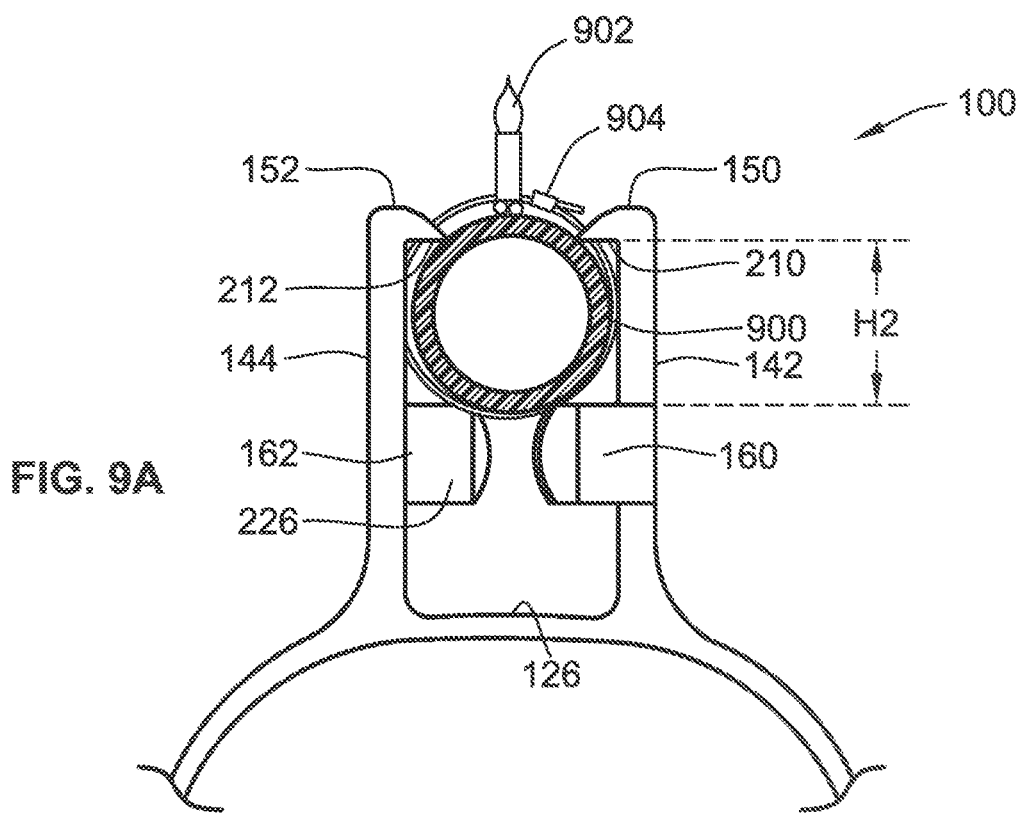
FIG. 9A is a side view of the top portion of a clip device with a section of PVC pipe secured on top of the tabs under the hook-like clip portions according to another installation option for use with the clip devices.
Figure 9B:
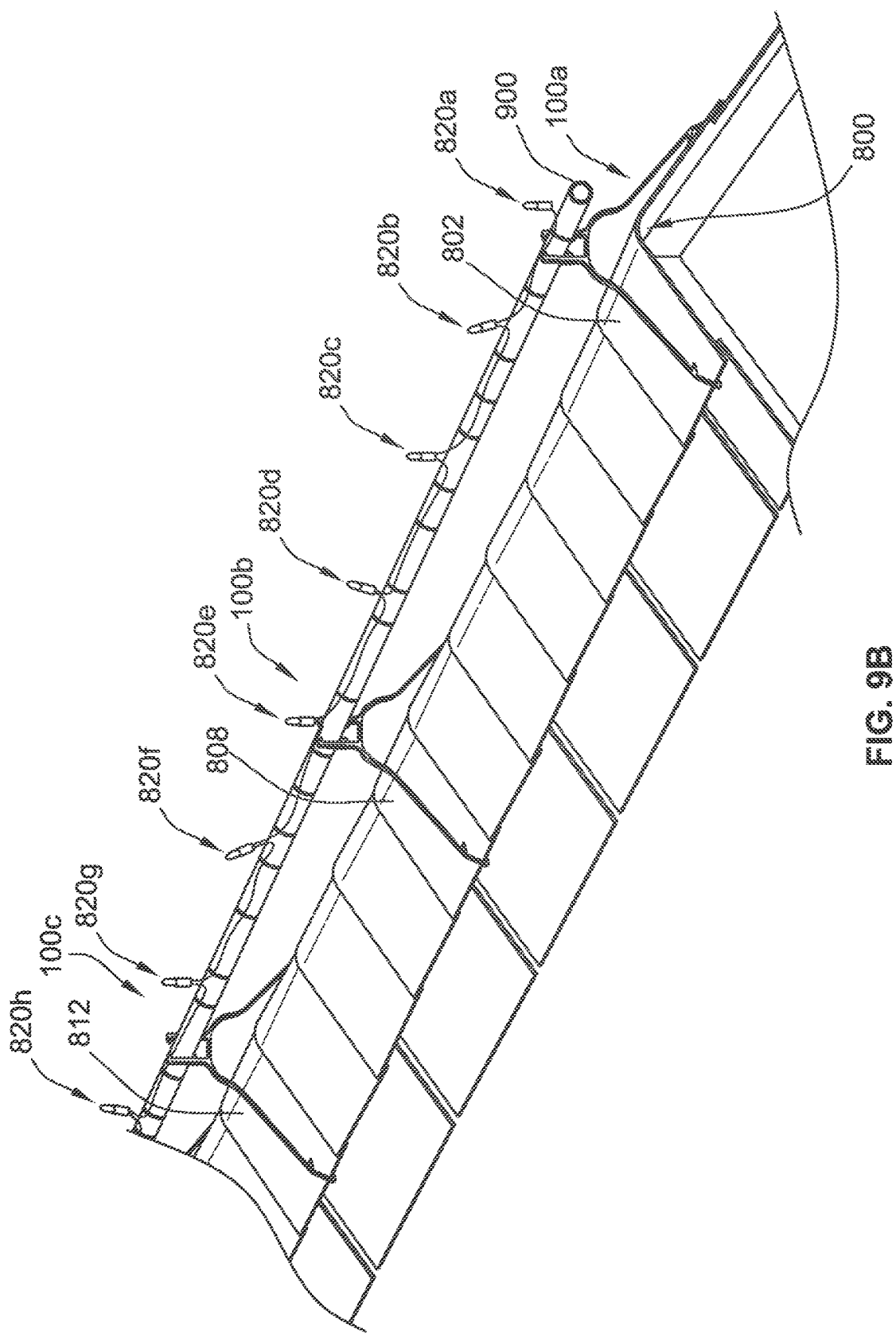
FIG. 9B is an isometric view of an example ridgeline of a roof with three clip devices installed on roof shingles carrying a pipe around which an LED light string is wound according to another installation option for use with the clip devices and a pipe structure.

As can be seen in FIG. 3, the retention tabs 160, 162 are positioned relative to the finger portions 142, 144 at a distance (H2) below the bottom engagement surfaces 210, 212 of the clip portions 150, 152. In this example, H2 is 0.625 inches, which, as can be seen in FIG. 9B, allows a 0.5" diameter pipe 900 to be retained above the retention tabs 160, 162, best seen in FIG. 9A. The clip portions 150, 152 also operate to retain the upper surface of the pipe 900, which can run along the ridgeline 800 held securely above the ridgeline 800 by clip devices 100a,b,c, as shown in FIG. 9B. The bottom area of the pipe 900 rests on the retention tabs 160, 162 as shown in FIG. 9A. Using a pipe 900, such as a ½" PVC pipe is another popular way of mounting smaller string lights 820a-h, such as LED or micro LED lights to a ridgeline. The clip devices 100 herein can be used, together with a pipe 900 or equivalent structure, to mount an LED or micro LED string of lights along the pipe 900, which is held above the ridgeline by multiple clip devices, such as the clip devices 100a,b,c. The wires of the LED strings can be wound around the pipe and secured by zip ties 904, such as shown in FIG. 9A. The bulbs 902 of the LED strings will be oriented in an upright manner toward the sky when installed on a ridgeline, which will create a uniform and neat appearance on the ridgeline. Some conventional clips produce an appearance of bulbs that are askew from one another, have a haphazard or inconsistent orientation from one bulb to the next, or do not allow them to be oriented toward the sky, but rather parallel to earth.

The flexible legs 130, 132 are mechanically coupled to the finger portions 142, 144 so that the opposite finger portion 144, 142 moves in a direction away from a direction of movement of the flexible leg 130, 132. As discussed above in connection with FIGS. 4B and 4C, spreading the legs 130, 132 apart (arrows A1, A2) causes the clip portions 150, 152 to rotate inwardly toward one another (arrows B1, B2). As long as the legs 130, 132 are spread wide enough to keep tension on the corresponding finger portions 142, 144, the bulb socket 410 will remain securely in the clip device 100. However, releasing the bulb socket 410 from the clip device 100 can be accomplished easily and quickly by simply squeezing the legs 130, 132 together in the direction of arrows C1, C2 shown in FIG. 5A. By urging the legs 130, 132 toward one another, the finger portions 142, 144 start rotating away from each other, as shown by the arrows C3, C4 in FIG. 5B. Once the clip portions 150, 152 are clear of the housing of the bulb socket 410, the entire bulb assembly 400, 410 can be freely removed from the clip device 100, without getting snagged or caught along the way. Even the wires (not shown for ease of illustrations), will easily clear the tabs 160, 162 by squeezing the legs together 130, 132. In fact, if the entire clip device 100 is held upside down, gravity will simply allow the bulb assembly 400, 410 to fall away from the clip device 100 together with its wires. The installer can grab a number of clip devices 100, squeeze the respective legs together, and release a number of bulbs simultaneously using this method. The starting width, W4, shown in FIG. 4B, reduces to a smaller width, W3, shown in FIG. 4C; whereas in FIG. 5A, the starting width W4 increases to a larger width W5 shown in FIG. 5B that is wider than a width of the bulb socket 410. Because the bulb assembly 400, 410 can be released vertically away from the clip device 100, the retaining clips 160, 162 will not pose any impediment to the release path of the bulb assembly 400, 410 including its wires 830 (see FIG. 8). The clip device 100 can be composed of a plastic or metal or any other material that allows the legs 130, 132 and fingers 142, 144 to flex.

The tabs 160, 162 serve another purpose, which is to act as retaining clips to secure adjacent pairs of clip devices 100 together, such as shown in FIGS. 6A, 6B, and 7A-7C. To secure one clip device 100 to another clip device 100 or multiple clip devices 100, the two clip devices 100a, 100b are offset from one another as shown in the top cross-sectional view of FIG. 7A. The clip device 100b is brought toward clip device 100a in the direction of E1, and then the clip devices 100a, 100b are slid past one another (e.g., in the direction of arrow E2 in FIG. 7B) until the tabs interlock as shown in FIG. 7C. In this example, the retention tab 162b of the clip device 100b slides through the elongated slot 204 of the clip device 100a, and the retention tab 162a of the clip device 100a slides through the elongated slot 202 of the clip device 100b. Thus, one tab of each clip device is inserted through a corresponding elongated slot of the adjacent clip device, and vice versa.

Figure 10A:
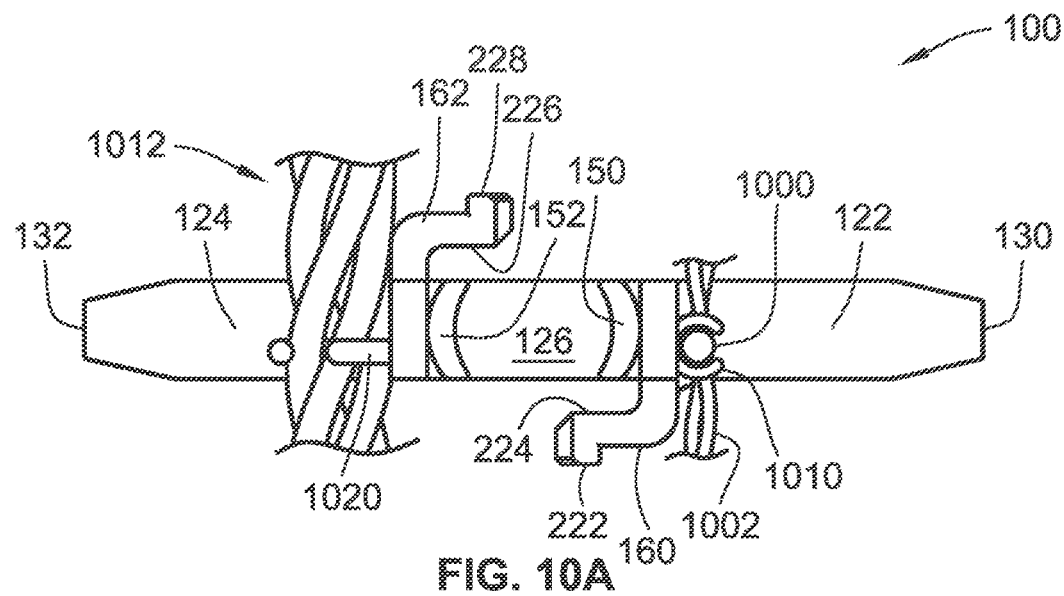
FIG. 10A is a top view of an alternate embodiment of the clip device having a wire retention feature and a bulb holding feature arranged on fingers of the clip device.
Figure 10B:
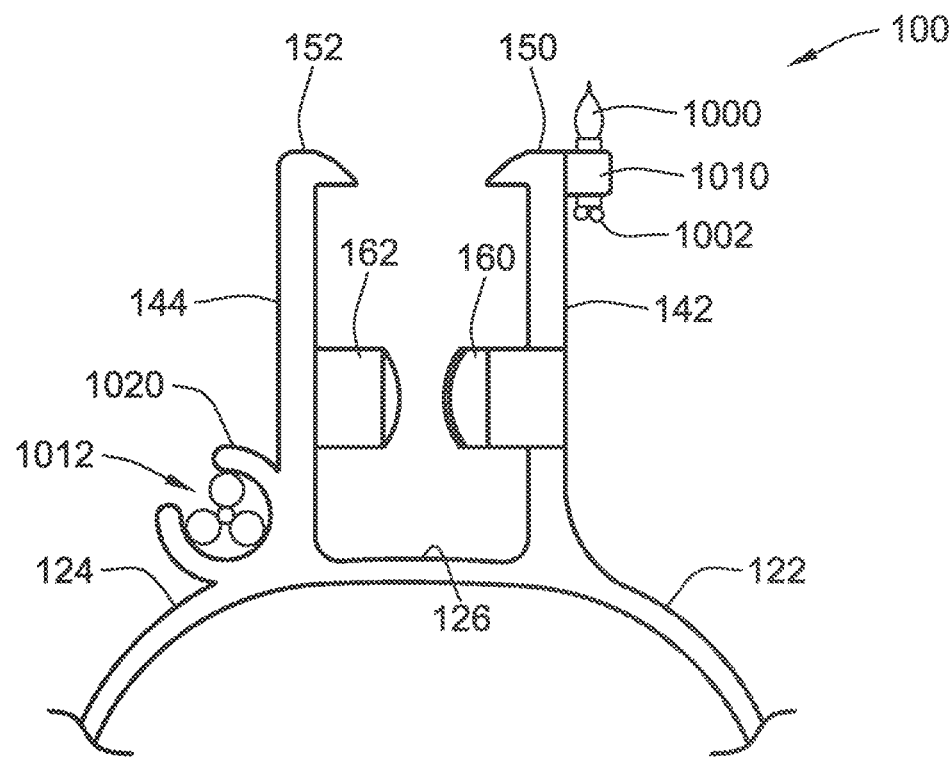
FIG. 10B is a side view of the clip device shown in FIG. 10A.

The clip device 100 can include optional wire management and bulb holding features, such as shown in FIGS. 10A and 10B. For ease of illustration and discussion, the clip device 100 shown in FIGS. 10A and 10B include both features, but one or both of these features can be incorporated into any of the clip devices disclosed herein. The clip device 100 includes a wire management feature 1020, which in this example is shown as having a C-shape, to retain wires 1012 of a light string connected to bulbs retained by the clip device 100. A top view of this arrangement can be seen in FIG. 10A. Likewise, or alternately, the clip device can include a bulb holding feature 1010, configured to hold a small bulb socket therein. The wires 1002 from the light string powering the bulbs 1000 run underneath the bulb holding feature 1010, which also has a C-shaped profile to allow the bulb socket 1010 to be snapped in and out of the feature 1010. For example, this feature 1010 would allow the installation of an LED string without the pipe 900 shown in FIG. 9B. The wire management feature 1020 can also be used to take up slack in the wires 1012 of a bulb light string and to ensure that the wires 1012 do not catch on the tabs 160, 162.

Figure 11:
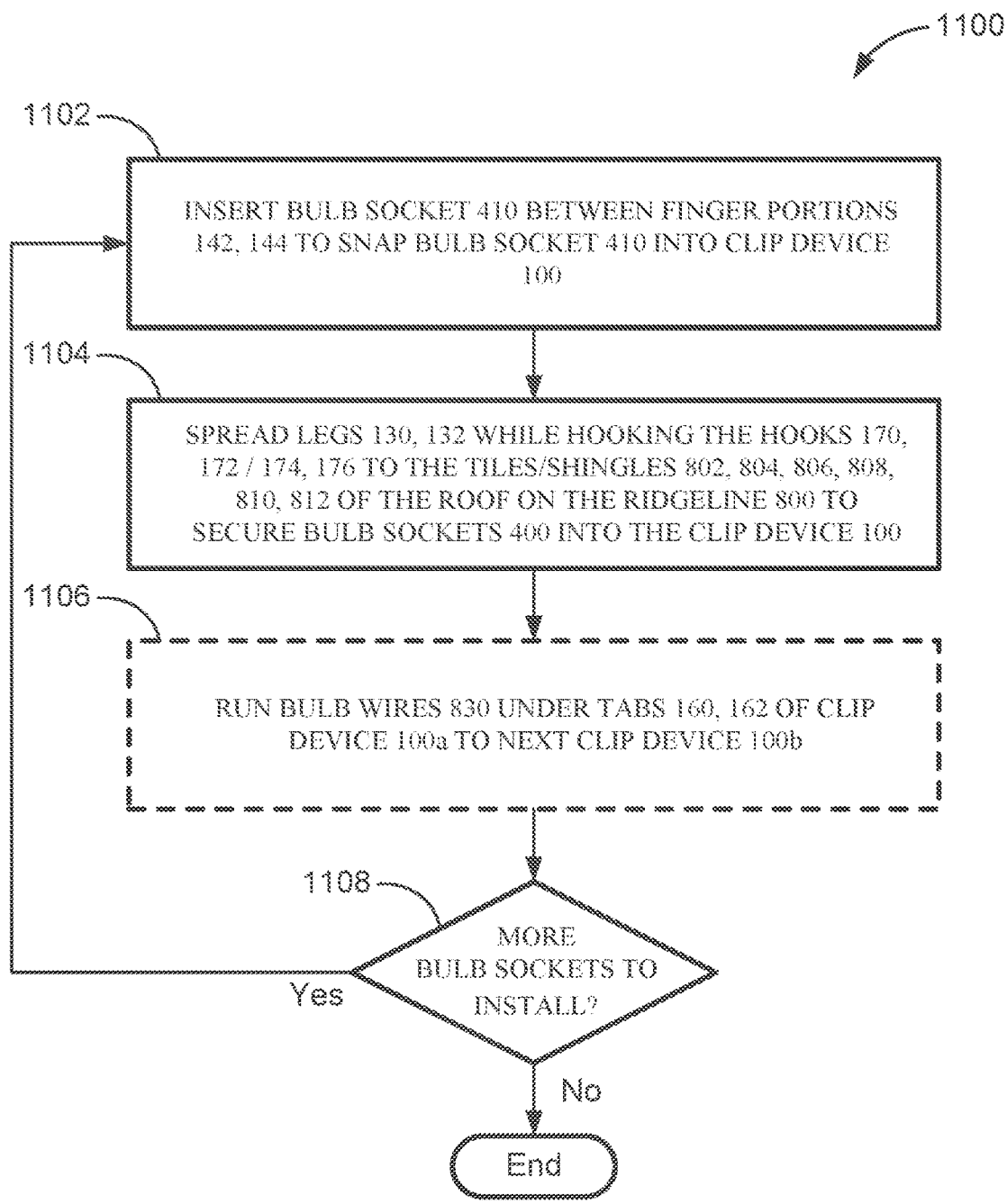
FIG. 11 is a flow chart of an example method of installing clip devices together with bulb sockets on a ridgeline of a roof.
Figure 12:
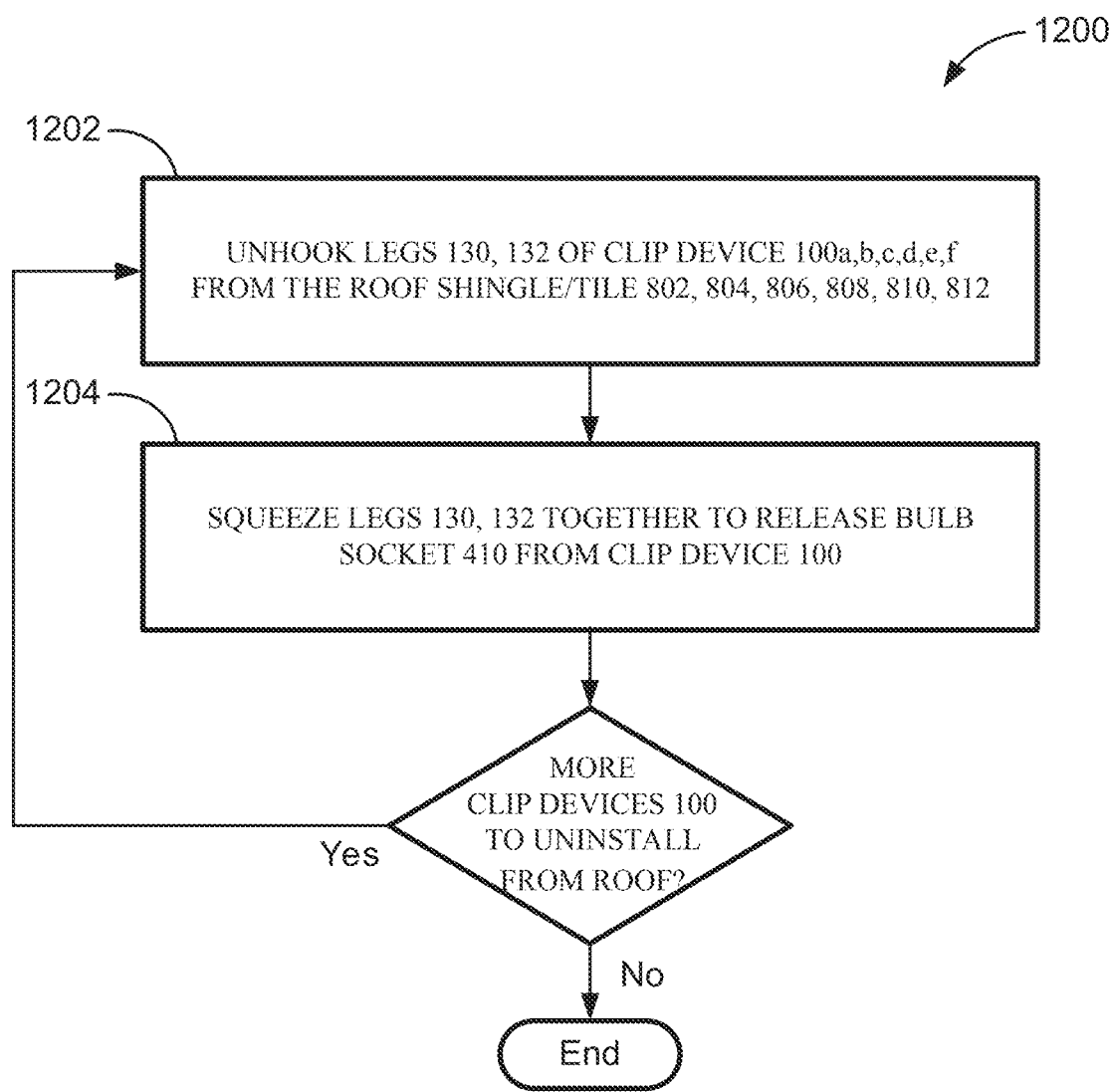
FIG. 12 is a flow chart of another example method of uninstalling clip devices hooked to a ridgeline of a roof and freeing the bulb sockets therefrom.
Figure 13:
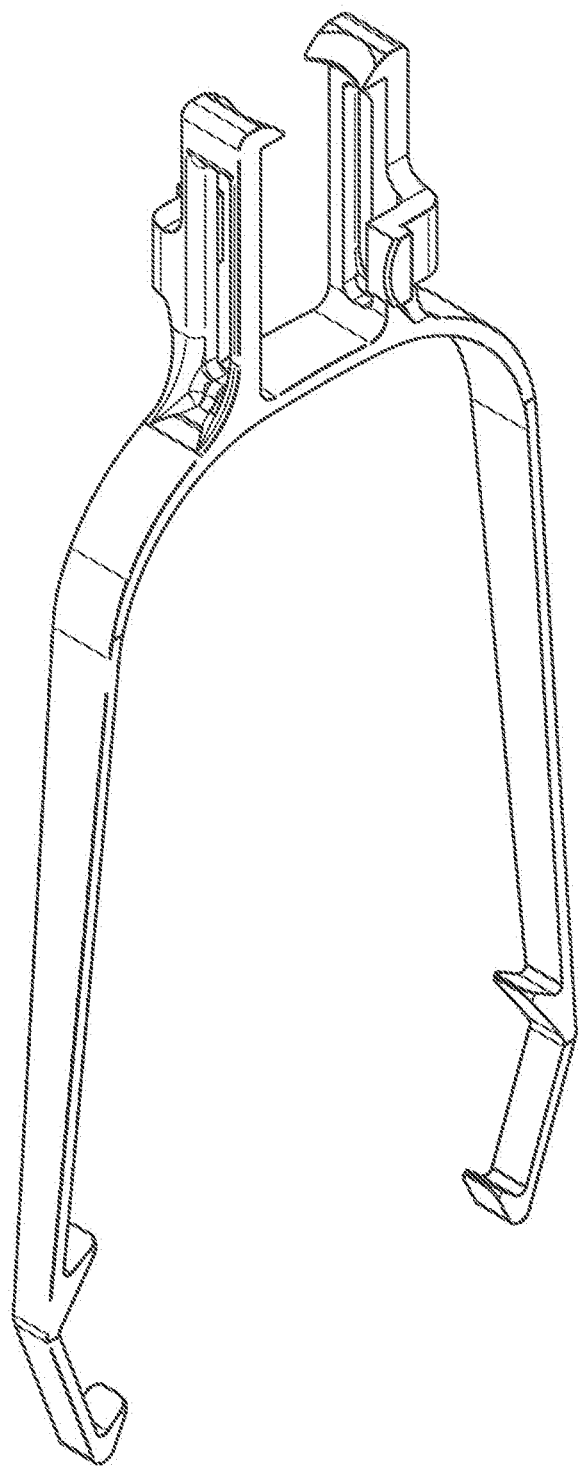
FIG. 13 is an isometric top right view of a roof ridgeline clip device.
Figure 14:
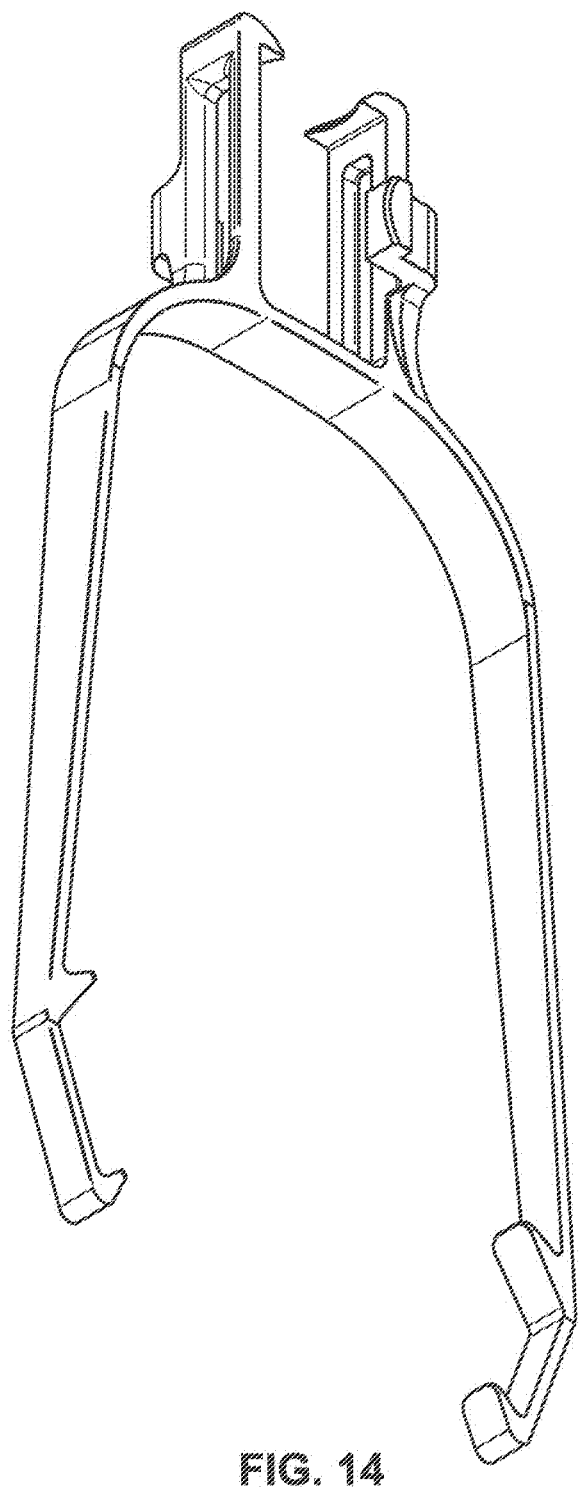
FIG. 14 is an isometric bottom right view of the roof ridgeline clip device of FIG. 13.
Figure 15:
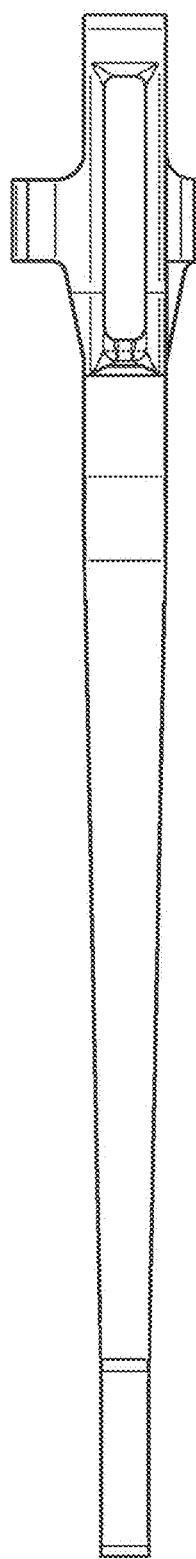
FIG. 15 is a side view of a left side of the roof ridgeline clip device of FIG. 13.
Figure 16:
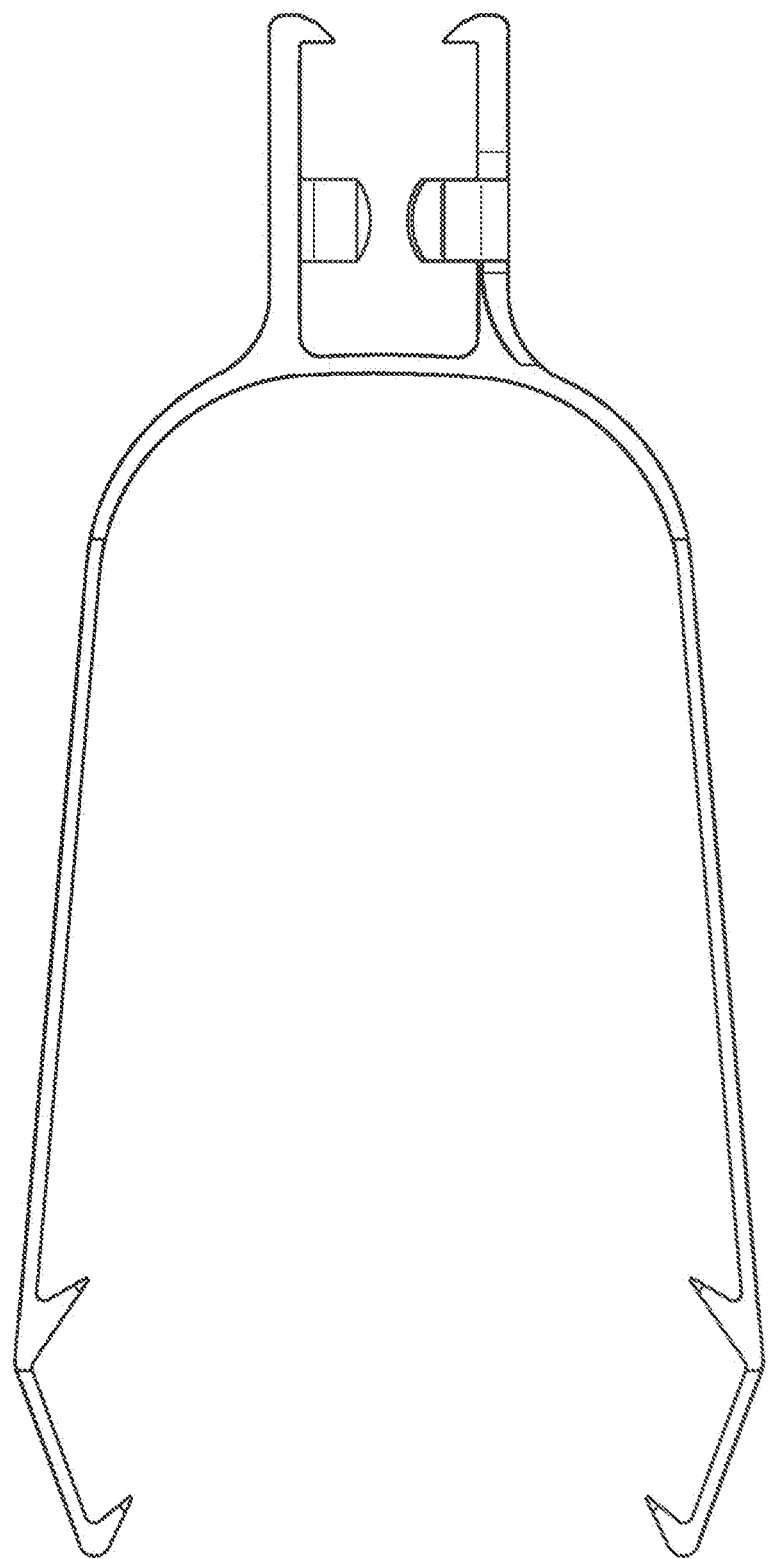
FIG. 16 is a front view of the roof ridgeline clip device of FIG. 13.
Figure 17:
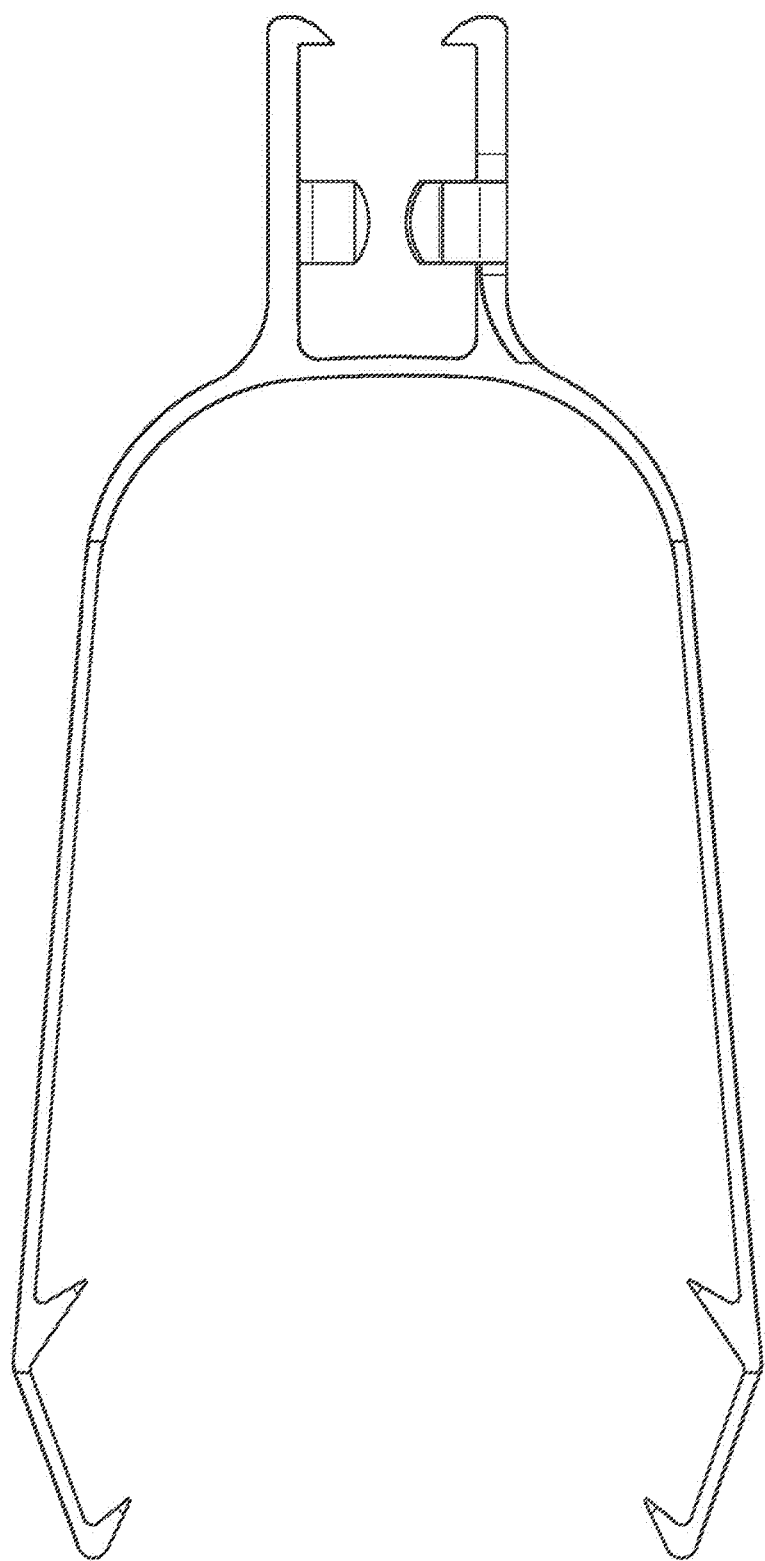
FIG. 17 is a rear view of the roof ridgeline clip device of FIG. 13.
Figure 18:
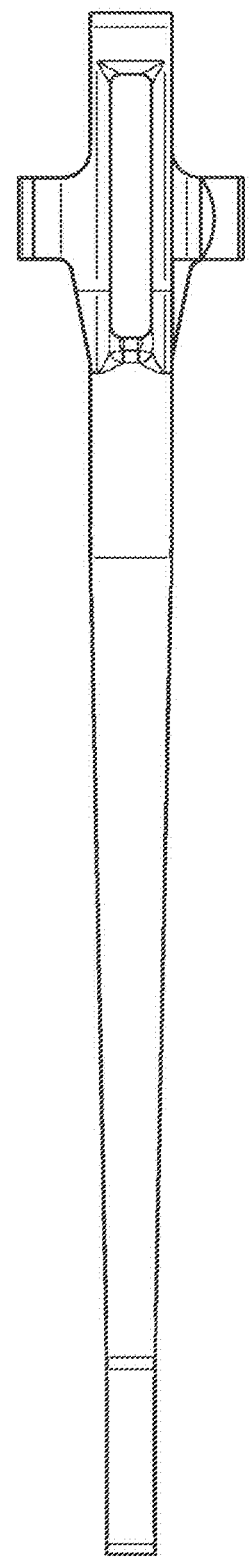
FIG. 18 is a side view of a right side of the roof ridgeline clip device of FIG. 13.
Figure 19:
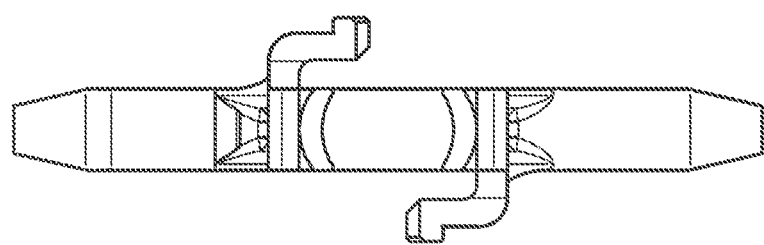
FIG. 19 is a top view of the roof ridgeline clip device of FIG. 13.
Figure 20:
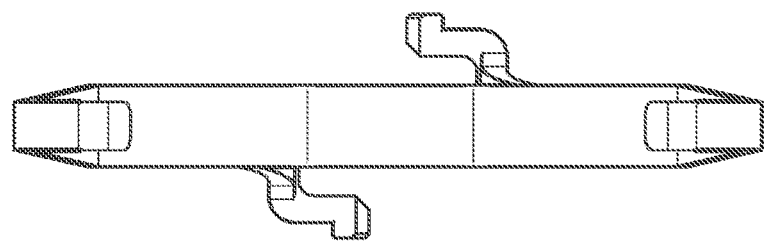
FIG. 20 is a bottom view of the roof ridgeline clip device of FIG. 13.

The present disclosure relates to methods of installing and instructing installers to install clip devices on a roof. An example flowchart of a method 1100 is shown in FIG. 11. The method 1100 includes instructing an installer to carry out the following steps. The installer is instructed to insert a bulb socket 410 of a light string between the first finger portion 142 and the second finger portion 144 of a clip device 100 until the bulb socket 410 is secured by the first clip portion 150 and the second clip portion 152 between the first finger portion 142 and the second finger portion 144 (see FIG. 4B) (1102). The installer is instructed to spread the first leg 130 and the second leg 132 away from each other to cause the first and second clip portions 150, 152 to bend toward one another to clamp the bulb socket 410 between the first and second finger portions 142, 144. Then, the installer is instructed to install the first clip device 1100 to straddle a shingle or tile on the ridgeline 800 by causing the first hook 170, 172 and the second hook 174, 176 to hook under respective ends of the first shingle or tile (e.g., 802, 804, 806, 808, 810, or 812) to hold the clip device 100 in an upright manner on the ridgeline 800 with a first bulb 400 coupled to the bulb socket 410 pointing away from the roof (e.g., toward the sky) (1104). Optionally, the installer can be instructed to arrange wires 830 of the light string so that they run underneath, relative to the top side 106, the first tab 160 and the second tab 162 (1106). If there are more bulb sockets 400 to install in clip devices 100 (1108), steps 1102 and 1104 and optionally 1106 are performed until a desired number of clip devices 100 are installed on the ridgeline 800 of the roof (1108). The two different locations of the hooks on the legs 130, 132 of the clip device 100 accommodate different shingle sizes, such as 10" shingle and a 12" shingle. This way, the same clip device 100 can be used to hook onto shingles of different sizes. Although two sets of hooks 170, 172 and 174, 176 are shown in FIG. 1, additional sets of hooks can be added to accommodate different sizes of shingles, e.g., shingles of a metric size. The lengths of the legs 130, 132 can be extended or shortened to accommodate hook spacing for different shingle or tile dimensions. In addition, the angle of each hook 170, 172, 174, 176 can be adjusted to create a more or less aggressive retention of the shingle or tile. In FIG. 1, the angle of the first hook 170 relative to the first leg 130 is 70 degrees, and the angle of the hook 174 relative to the leg 130 is 55 degrees. The skilled person will understand that these angles can be adjusted based on the stance of the leg, the thickness of the shingle or tile, and so forth.

Figure 8:
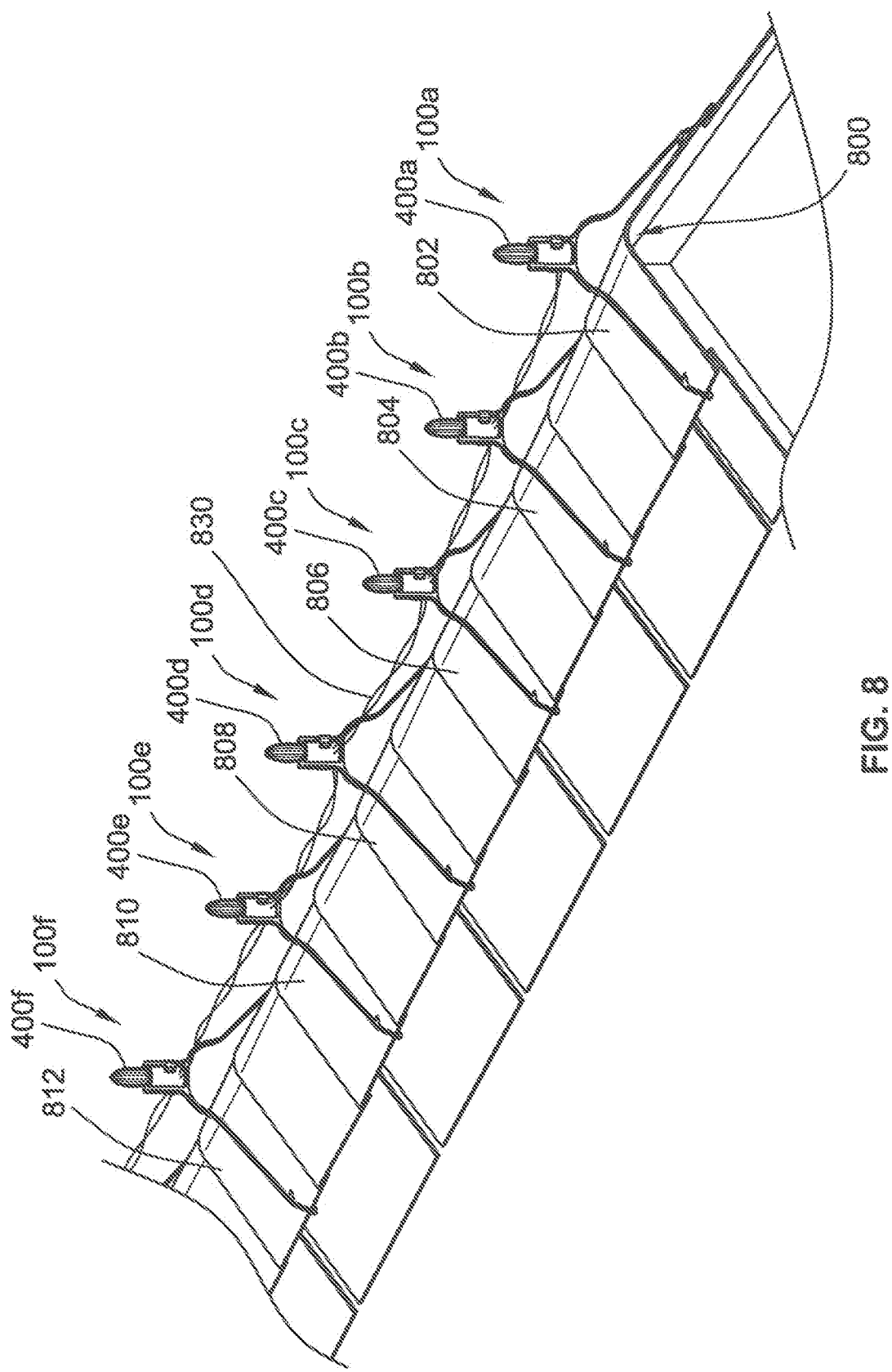
FIG. 8 is an isometric view of an example ridgeline of a roof with six clip devices installed on respective roof shingles carrying a string of light bulbs with the wires running underneath the tabs of the clip devices.

To remove or uninstall the clip devices 100 from a ridgeline 800 and the bulb sockets 410 from the clip devices 100, an example method 1200 instructs an installer to carry out the following steps. The installer is instructed to unhook the first leg 170, 174 and the second leg 172, 176 of the clip device 100 being removed from the roof 800 to free it therefrom (1202). The installer is instructed to squeeze the first leg 170, 174 and the second leg 172, 176 together to cause the first and second finger portions 142, 144 to bend away from one another until the bulb socket 410 is released from the first clip portion 150 and the second clip portion 152 (1204). If there are more clip devices and bulb sockets to be uninstalled, the method 1200 repeats steps 1202 and 1204 until all of the clip devices (e.g., 100a-f in FIG. 8) are uninstalled from the roof and all bulb sockets 410 are removed from the corresponding clip devices 100a-f. It should be well understood that while only 8 clip devices are shown in FIG. 8 as an example, more or fewer clip devices can be installed depending on the length of the ridgeline or the desired number of light bulbs to install. For example, only a few clip devices would be sufficient to add bulbs to the roof ridgeline of a dog house, but many, e.g., over 20 or over 30 would be needed to extend across an entire roof ridgeline of a residential house.

The method 1200 can optionally include instructing the installer to stack the clip devices 100 together for storage. To do so, the installer is instructed to interlock corresponding pairs of the first and second tabs 160, 162 of a given one of the clip devices (e.g., 100a) (see FIG. 6A or 6B) into corresponding first and second elongated slots 202, 204 of an other clip device (e.g., 100b) that is adjacent to the clip device 100a. While the overall width of the stacked clips increases slightly, there is no theoretical limit to the number of clip devices 100 that can be stacked together in this manner except for storage or packing requirements.

Figure 21A:
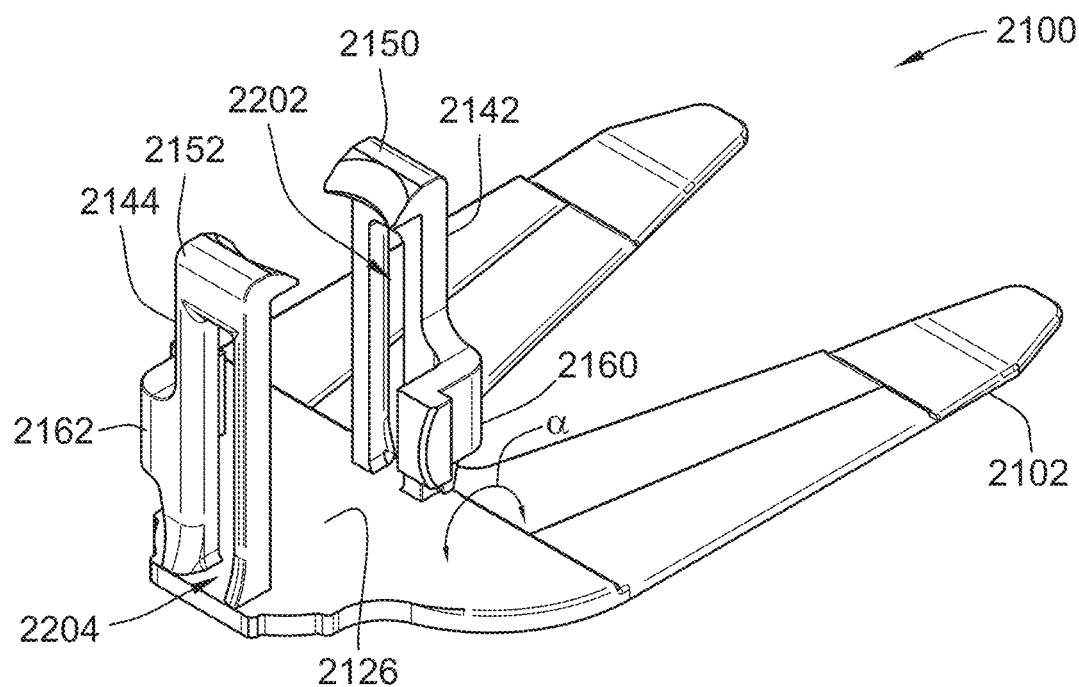
FIG. 21A is a shingle clip device according to another aspect of the present disclosure having a V-shaped clip configured to be inserted underneath a shingle or tile of a roof.
Figure 21B:
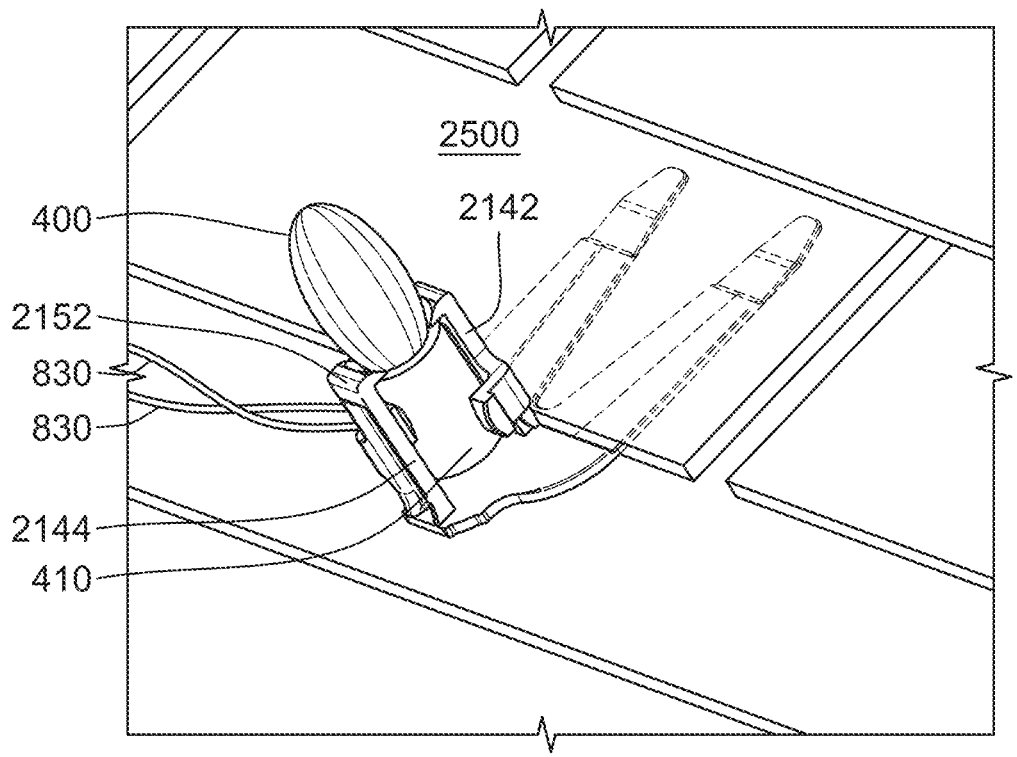
FIG. 21B shows the shingle clip device of FIG. 21A installed under a shingle of a roof.

FIG. 21A is an isometric top view of a shingle clip device 2100 according to another aspect of the present disclosure. Unlike the clip device 100 shown and described above, the shingle clip device 2100 lacks extending legs but rather has a V-shaped clip 2102 extending away from an upper surface 2126 of the clip device 2100. The clip device 2100 includes two finger portions 2142, 2144 just like the finger portions 142, 142 described above in connection with the clip device 100. The finger portions 2142, 2144 include tabs 2160, 2162 just like the tabs 160, 162 shown and described in connection with the clip device 100. Optional elongated slots 2202, 2204 are also incorporated into the finger portions 2142, 1244. The V-shaped clip 2102 can be angled relative to the upper surface 2126 by angle α as shown in FIG. 21A. In this example, the angle α is 180 degrees, but as can be seen in FIG. 21B, this angle can be reduced to accommodate a roof pitch of the roof (e.g., 4/12 to 9/12) where the clip device 2100 is installed. This angle α can be adjusted by the installer after installing the clip device 2100 under a shingle 2500, as shown in FIG. 4B, to orient the bulb 400 toward the sky and orthogonal to earth. The bulb socket 410 is held between the fingers 2142, 2144 of the clip device 2100 between the tabs 2160, 2162 and the clip portions 2150, 2152 just like in the clip device 100 disclosed above.

The example dimensions given herein produce a clip device that can accommodate C7 and C9 bulbs and can be installed on 10" or 12" shingles. The dimensions herein are examples only, and the skilled person will understand, from the guidance given in the present disclosure, that different dimensions can be used to accommodate different bulb sizes and different shingle dimensions. For example, in installations that use metric values instead of English or imperial values, the dimensions can be readily adjusted using English-to-metric conversion factors.

An ornamental roof ridgeline clip device design is also disclosed. Alternately, the device can be called a roof clip, or a ridge clip, or a clip for a ridgeline, or a clip for a roof. As will be understood by those skilled in the art, there are a variety of ways to implement the functional features described herein without losing their function. The inventor has chosen a particular aesthetic design for the clip device, which is mirror-image symmetrical about its central axis and will enhance without detracting from the overall aesthetic when installed on a ridgeline of a roof. The idea was to design a clip that will not take away from the aesthetic of the roof, and that will be nearly invisible at nighttime. In one example, the clips can be black in color, or they can match the color of shingles (e.g., gray) or tiles (e.g., orange) of a roof to blend in during the daytime. The clip devices when installed along the entire length of a ridgeline can resemble ornamental roof cresting.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed:

1. A clip device to retain a bulb socket, comprising:
a support operatively coupled to a plurality of finger portions spaced apart from each other,
wherein each of the finger portions has an arc-shaped portion,
wherein the plurality of finger portions is configured to receive therebetween a bulb socket selected from a group of bulb sockets having a first socket with a first diameter and a second socket with a second diameter different from the first diameter;
a plurality of flexible legs forming a V-shaped clip that is coupled to the support and configured to be inserted under a shingle, wherein a width of each of the flexible legs tapers toward an end of the V-shaped clip; and
a retention feature configured to retain a structure other than the bulb socket, wherein
an angle between the plurality of finger portions and the V-shaped clip is configured to be adjusted relative to the shingle.

2. The clip device of claim 1, wherein at least a portion of the retention feature extends away from the clip device.

3. The clip device of claim 1, wherein the retention feature is located opposite the plurality of finger portions relative to the body support.

4. The clip device of claim 1, wherein the retention feature is not involved in retaining the bulb socket, and the retention feature is remote from the plurality of fingers.

5. The clip device of claim 1, wherein the structure other than the bulb socket includes a wire or a PVC pipe.

6. The clip device of claim 1, wherein the first diameter of the first socket corresponds to a diameter of a C7 bulb socket, and wherein the second diameter of the second socket corresponds to a diameter of a C9 bulb socket.

7. The clip device of claim 1, wherein a bulb is oriented towards the sky responsive to the bulb being installed into the bulb socket.

8. The clip device of claim 1, wherein a distance between a top of the plurality of finger portions and the support is at least as tall as a C9 bulb socket.

9. The clip device of claim 1, wherein the plurality of finger portions is symmetrical about the support.

10. The clip device of claim 1, wherein the plurality of finger portions is two finger portions.

11. The clip device of claim 1, wherein the clip device is in combination with one or more light strings.

12. A clip device to retain a bulb socket, comprising:
a body;
a bulb holding feature coupled to the body,
wherein the bulb holding feature is configured to receive therein a bulb socket selected from a group of bulb sockets having a first socket with a first diameter and a second socket with a second diameter different from the first diameter;
a plurality of flexible legs that is coupled to the body, at least a portion of each of the plurality of flexible legs being configured to be positioned under a shingle; and
a retention feature configured to retain a structure other than the bulb socket,
wherein the retention feature extends in a direction opposite the bulb holding feature relative to the body, and wherein
an angle between the bulb holding feature and the flexible legs is configured to be adjusted relative to the shingle.

13. The clip device of claim 12, wherein the bulb holding feature is configured to receive therein the bulb socket by snapping the bulb socket relative to the bulb holding feature.

14. The clip device of claim 12, wherein the bulb holding feature includes a first arc-shaped member and a second arc-shaped member that faces the first arc-shaped member to form an opening through which the bulb socket is retained.

15. The clip device of claim 14, wherein the first arc-shaped member and the second arc-shaped member are configured to move relative to one another.

16. The clip device of claim 12, wherein the retention feature is located opposite the bulb holding feature relative to the body.

17. The clip device of claim 12, wherein at least a portion of the retention feature extends away from the clip device.

18. The clip device of claim 12, wherein the retention feature is not involved in retaining the bulb socket, and the retention feature is remote from the bulb holding feature.

19. The clip device of claim 12, wherein the first diameter of the first socket corresponds to a diameter of a C7 bulb socket, and wherein the second diameter of the second socket corresponds to a diameter of a C9 bulb socket.

20. The clip device of claim 12, wherein the structure other than the bulb socket includes a wire or a PVC pipe.

21. The clip device of claim 12, wherein a bulb is oriented towards the sky responsive to the bulb being installed into the bulb socket.

22. The clip device of claim 12, wherein a distance between a top of the bulb holding feature and the body is at least as tall as a C9 bulb socket.

23. The clip device of claim 12, wherein the clip device is in combination with one or more light strings.

24. An assembly of clip devices, wherein each of the clip devices correspond to the clip device of claim 1.

* * * * *